US 6,670,404 B2

(12) United States Patent
Martel et al.

(10) Patent No.: US 6,670,404 B2
(45) Date of Patent: Dec. 30, 2003

(54) POLYMERIC FOAM POWDER PROCESSING TECHNIQUES, FOAM POWDERS PRODUCTS, AND FOAMS PRODUCED CONTAINING THOSE FOAM POWDERS

(75) Inventors: Bryan Martel, Nevada City, CA (US); Robert Villwock, Grass Valley, CA (US); Herman Stone, Williamsville, NY (US)

(73) Assignee: Mobius Technologies, Inc., Grass Valley, CA (US)

(*) Notice: Subject to any disclaimer, the term of this patent is extended or adjusted under 35 U.S.C. 154(b) by 127 days.

(21) Appl. No.: 09/748,307

(22) Filed: Dec. 21, 2000

(65) Prior Publication Data

US 2002/0002208 A1 Jan. 3, 2002

Related U.S. Application Data

(60) Provisional application No. 60/172,081, filed on Dec. 23, 1999.

(51) Int. Cl.[7] .................................................. C08J 11/04
(52) U.S. Cl. ............................ 521/40; 521/49; 521/50; 521/50.5; 521/61; 521/99; 521/155; 521/170
(58) Field of Search ................................. 521/155, 170, 521/61, 50, 50.5, 40, 49, 99

(56) References Cited

U.S. PATENT DOCUMENTS

| 1,443,181 A | 1/1923 | Hill |
| 3,928,188 A | 12/1975 | Link et al. ................... 209/250 |
| 3,960,334 A | 6/1976 | Wudyka ........................ 241/60 |
| 3,963,608 A | 6/1976 | Zimmermann et al. ...... 209/300 |
| 4,200,679 A | 4/1980 | Klein |
| 4,304,873 A | 12/1981 | Klein ........................... 521/53 |
| 4,451,503 A | 5/1984 | Blum et al. .................. 427/53.1 |
| 4,451,583 A | 5/1984 | Chesler ....................... 521/49.5 |
| 4,473,673 A | 9/1984 | Williams et al. ............. 523/318 |
| 5,095,961 A | 3/1992 | Nakagawa ................... 141/275 |
| 5,253,813 A | 10/1993 | Belliveau et al. .............. 241/24 |
| 5,411,213 A | 5/1995 | Just .............................. 241/16 |
| 5,451,376 A | 9/1995 | Proska et al. ................ 422/131 |
| 5,547,276 A | 8/1996 | Sulzbach et al. ............ 366/139 |
| 5,641,128 A | 6/1997 | Kimura et al. ................ 241/63 |
| 5,669,559 A | 9/1997 | Wagner et al. ................ 241/23 |
| 5,836,527 A | 11/1998 | Irwin et al. ................... 241/49 |
| 5,882,432 A | 3/1999 | Jody et al. ..................... 134/26 |
| 5,885,693 A | 3/1999 | Eder et al. ................... 428/160 |
| 6,042,764 A | 3/2000 | Eder et al. ................... 264/45.3 |
| 6,045,345 A | 4/2000 | Eder et al. ................... 425/4 R |
| 6,218,458 B1 | 4/2001 | Vidaurre et al. ............. 524/494 |
| 2001/0006991 A1 | 7/2001 | Vidaurre et al. ............. 524/494 |

FOREIGN PATENT DOCUMENTS

| CA | 2086780 | 7/1993 |
| CA | 2106649 | 3/1994 |
| DE | 30 04 004 | 8/1981 |
| DE | 38 34 425 | 4/1990 |
| DE | 40 19240 | 1/1991 |
| DE | 94 09 906.5 | 12/1994 |
| DE | 44 16 749 | 2/1995 |
| DE | 195 15 691 | 10/1996 |
| DE | 196 28 437 | 1/1998 |
| DE | 197 57 431 | 6/1999 |
| EP | 349 800 | 1/1990 |
| EP | 0 551 655 | 7/1993 |
| EP | 589 321 | 3/1994 |
| EP | 594 307 | 5/1994 |
| EP | 657 266 | 6/1995 |
| EP | 692 353 | 1/1996 |
| EP | 716 888 | 6/1996 |
| EP | 0 955 142 | 11/1999 |
| FR | 2 460 987 | 1/1981 |
| GB | 922306 | 3/1963 |
| GB | 1 435 210 | 5/1976 |
| NL | 7014580 | 4/1972 |
| WO | WO 91/05616 | 4/1994 |
| WO | WO 95/33566 | 12/1995 |
| WO | WO 99/43745 | 9/1999 |

OTHER PUBLICATIONS

International Search Report, PCT/US00/35318, dated Sep. 6, 2001.

*Primary Examiner*—John M. Cooney, Jr.
(74) *Attorney, Agent, or Firm*—Morrison & Foerster LLP

(57) ABSTRACT

This relates variously to techniques for comminuting polymeric foams, to techniques for preparing polymeric foams containing that comminuted foam, and to the resulting comminuted foam powder and polymeric foams. The procedures may be used on foams containing production contaminants such as polyolefins, paper, and foam skins and on other foams containing consumer contaminants such as wood, metal, leather, etc. The comminuted foam powder, with or without contaminants, preferably is screened or sifted to obtain a foam powder having a particle size of about 2 mm or less.

45 Claims, 19 Drawing Sheets

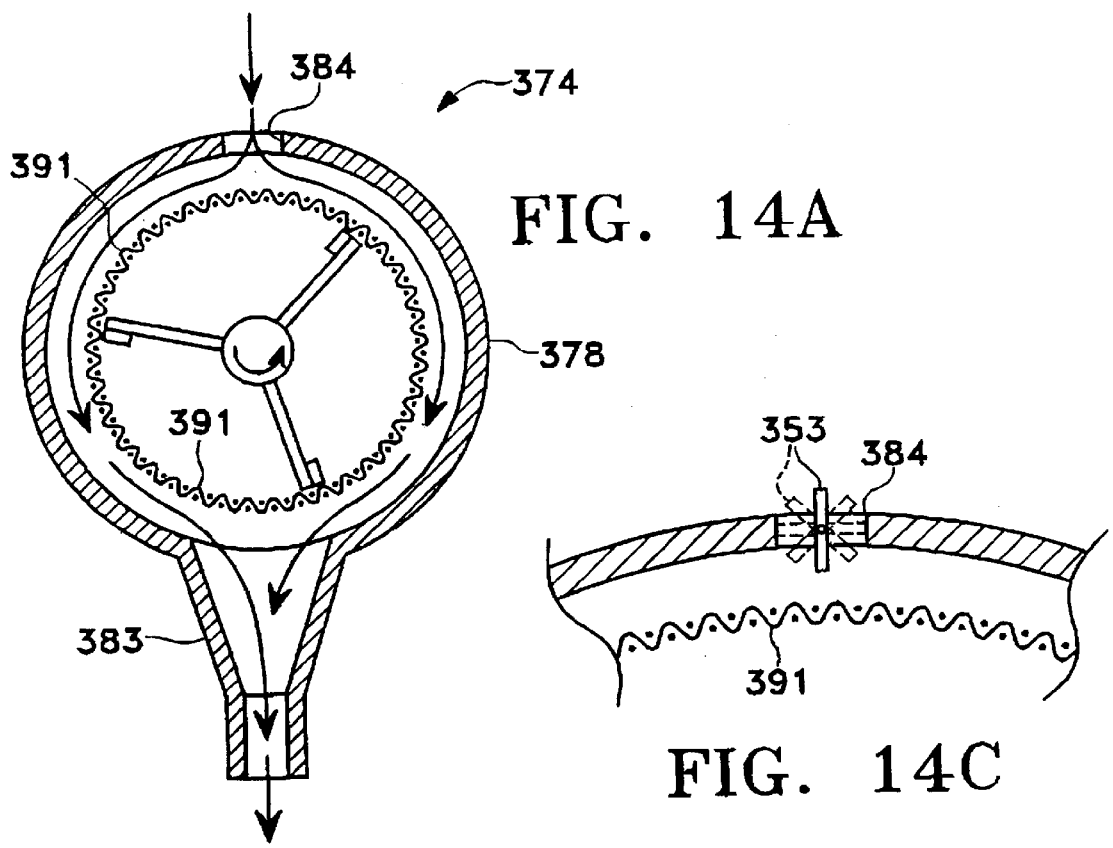
FIG. 14A
FIG. 14C
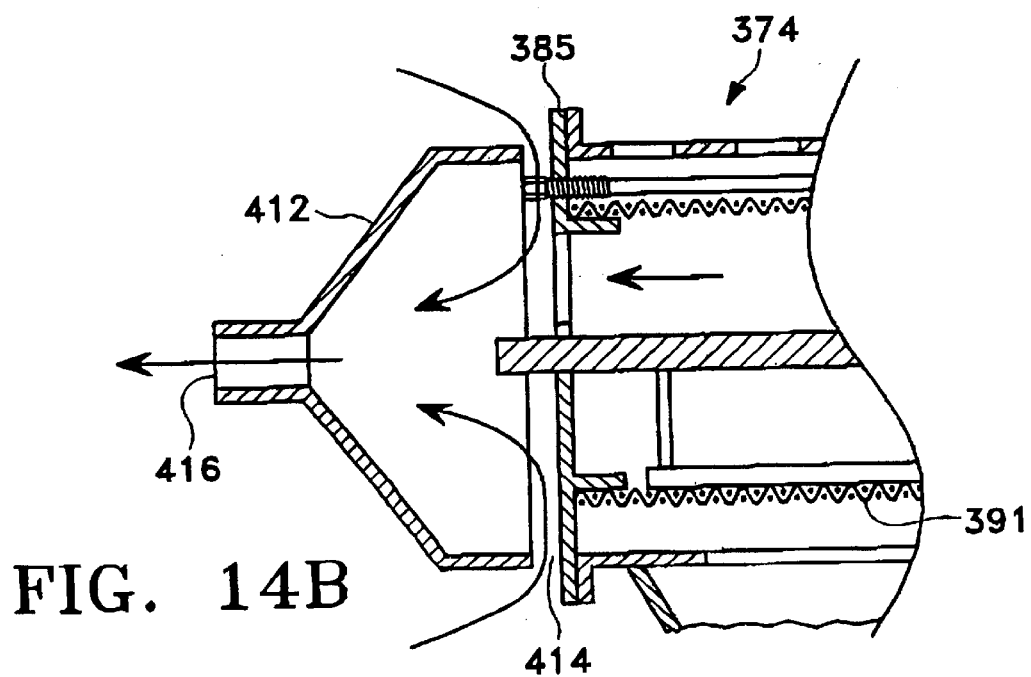
FIG. 14B

POLYMERIC FOAM POWDER PROCESSING TECHNIQUES, FOAM POWDERS PRODUCTS, AND FOAMS PRODUCED CONTAINING THOSE FOAM POWDERS

FIELD OF THE INVENTION

This invention relates variously to techniques for comminuting polymeric foams, to techniques for preparing polymeric foams containing that comminuted foam, and to the resulting comminuted foam powder and product polymeric foams. The procedures may be used on foams containing production contaminants such as polyolefins, paper, and foam skins and on other foams containing consumer contaminants such as wood, metal, leather, etc.

BACKGROUND OF THE INVENTION

Polymeric foams include a wide variety of materials, generally forming two-phase systems having a solid polymeric phase and a gaseous phase. The continuous phase is a polymeric material and the gaseous phase is either air or gases introduced into or formed during the synthesis of the foam. Some of these gases are known as "blowing agents." Some syntactic polymeric foams contain hollow spheres. The gas phase of syntactic foams is contained in the hollow spheres that are dispersed in the polymeric phase. These spheres can be made of a variety of materials including glass, metal, carbon and polymers. Other materials such as fillers, reinforcing agents, and flame retardants can be used to obtain specific foam properties. Polymeric foams, open-celled or closed-cell, are usually classified as flexible, semi-flexible, semi-rigid, or rigid. Flexible foams, foams that recover after deformation, are typically used in carpet backing, bedding, furniture and automotive seating. Rigid foam, foams that do not recover after deformation, are used in thermal insulation, packaging, and load bearing components. Examples of polymers commonly used in foams include epoxy, fluoropolymer, latex, polyisocyanurate, polyimide, polyolefin, polystyrene, polyurethane, poly(vinyl chloride) (PVC), silicone, and urea-formaldehyde.

Typical foam manufacturing processes result in polymeric foam wastes. For example, commercial procedures resulting in large quantities of polyurethane foam produce slabstock in a continuous pouring process. The resulting cast buns are often cut, for example, in pieces that are 1 to 2.5 m wide, 1.5 m high, and as long as 70 m. Foam buns are also made in boxes using batch processes. In either process, the outside of the bun is lined with a paper and/or plastic release sheet, and a layer of foam skin is formed there. The buns generally require trimming of the top and sides before the buns are cut or sliced for commercial use. These top and side trimmings include a foam waste product containing production contaminants.

By "production contaminant" we mean to include materials that are co-produced or used in the manufacture of slabstock or box foam, and are typically present in the scrap trimmed from the sides, top, and bottom of slabstock or box foam. Examples of production contaminants are those foam skins discussed above. Additionally, the term includes the release sheets or separators also discussed above, that are, e.g., of paper, paper coated with wax or polyolefin, and also may be of film, sheet, or netting made from polymer materials such as polyethylene, polypropylene, polystyrene, or other polyolefins. We will generically nominate the release sheets containing some amount of any polymer as "polymeric sheets". The skin material in trimmed scrap (or, "foam skins") is quite different in consistency and density from the desired foam product. The skin material is a tougher, more rubbery product, and has a higher density than the desired foam product. Foam skins are layers of non-foam or very high density foam that are formed during the foam polymerization procedures. Foam skin is also present in scrap such as "mushrooms" of material from foam molding operations that escape the mold. Foam skin is also found in off-spec molded parts.

Trimmings also result from foam fabrication processes in which useful shapes are cut from the buns. This type of waste is called fabrication scrap, and it generally contains lower amounts of production contaminants than waste from trimming buns.

Polymeric foam waste is also present in many discarded foam-containing products such as furniture, automobile seats, thermal insulation foams, and packaging foams. This type of waste is called "post-consumer waste". Post-consumer waste often contains contamination from other materials that were used in a fabricated part with the foam or from materials the foam was exposed to during its useful lifetime. These "consumer contaminants" include wood, ferrous metal, non-ferrous metal, textiles, leather, glass, dirt, oil, grease, adhesives, minerals, and plastics.

"Polyurethane" (PUR) describes a general class of polymers prepared by polyaddition polymerization of diisocyanate molecules and one or more active-hydrogen compounds. "Active-hydrogen compounds" include polyfunctional hydroxyl-containing (or "polyhydroxyl") compounds such as diols, polyester polyols, and polyether polyols. Active-hydrogen compounds also include polyfunctional amino-group-containing compounds such as polyamines and diamines. An example of a polyether polyol is a glycerin-initiated polymer of ethylene oxide or propylene oxide.

"PUR foams" are formed via a reaction between one or more active-hydrogen compounds and a polyfunctional isocyanate component, resulting in urethane linkages. As defined here, PUR foam also includes polyisocyanurate (PIR) foam, which is made with diisocyanate trimer, or isocyanurate monomer. PUR foams are widely used in a variety of products and applications. These foams may be formed in wide range of densities and may be of flexible, semi-flexible, semi-rigid, or rigid foam structures. Generally speaking, "flexible foams" are those that recover their shape after deformation. In addition to being reversibly deformable, flexible foams tend to have limited resistance to applied load and tend to have mostly open cells. "Rigid foams" are those that generally retain the deformed shape without significant recovery after deformation. Rigid foams tend to have mostly closed cells. "Semi-rigid" or "semi-flexible" foams are those that can be deformed, but may recover their original shape slowly, perhaps incompletely. A foam structure is formed by use of so-called "blowing agents." Blowing agents are introduced during foam formation through the volatilization of low-boiling liquids or through the formation of gas during the reaction. For example, a reaction between water and isocyanate forms $CO_2$ gas bubbles in PUR foam. This reaction generates heat and results in urea linkages in the polymer. Additionally, surfactants may be used to stabilize the polymer foam structure during polymerization. Catalysts are used to initiate the polymerization reactions forming the urethane linkages and to control the blowing reaction for forming gas. The balance of these two reactions, which is controlled by the types and amounts of catalysts, is also a function of the reaction temperature.

Effective recycling technologies are highly desirable in order to re-use the foam waste, to maximize the raw material resources of these foams, to reduce or to eliminate the adverse environmental impact of polymeric foam waste disposal, and to make polymeric foam production more cost-effective.

It is desirable to recycle flexible PUR foam by reducing that foam scrap to particles having a maximum particle size of about 2 mm and introducing the comminuted particles in making new flexible PUR foam, see for example U.S. Pat. No. 4,451,583, to Chesler. In the Chesler process, the comminuted particles are added to the reaction mixture for the new PUR, or to one of the reactive liquid components such as the polyhydroxyl compounds, and then new flexible foam is prepared in a conventional manner. Cryogenic grinding is disclosed in the '583 patent as a preferred grinding technique for forming the required foam scrap particle size.

U.S. Pat. No. 5,411,213, to Just, shows a process for grinding polymers such as PUR by adding an anti-agglomeration or partitioning agent and subjecting the material to a compressive shear force using for example a two-roll mill. In another technique, disclosed in U.S. Pat. No. 4,304,873, to Klein, micro-bits of flexible PUR foam are prepared by subjecting shredded flexible PUR foam and a cooling fluid, such as water, to repeated impact by a plurality of impact surfaces. In yet another technique, U.S. Pat. No. 5,451,376, to Proska et al, discloses a PUR foam comminution process and apparatus wherein a fine comminution is carried out by forcing a mixture of coarsely comminuted material and one of the liquid PUR reaction components through one or more nozzles.

Used foam objects, such as automobile cushioning materials, may be contaminated with grease or oil contaminants that destabilize the formation of new foam. U.S. Pat. No. 5,882,432, to Jody et al, describes a process for directly removing oil or grease contaminants from large PUR foam pieces.

Foam trimmings containing polymeric foam skin waste material, which is typically formed in slabstock on the outside of a foam bun, are difficult to grind effectively using conventional grinding conditions that are most suitable for grinding polymeric foam. The thermal insulating properties of foam make it difficult continuously to grind the foam in relatively long production runs because the grinding temperature tends to increase as grinding is continued, potentially resulting in thermal degradation of the polymeric foam. Production contaminants result in increased grinding temperatures. Furthermore, foam pieces and foam powder are difficult materials to handle in large quantities because these products bridge readily in various processing equipment. Moreover foam powder tends to coat the surfaces of processing equipment such as conveyers, mills and screens.

It is also difficult to grind production foam trimmings for re-use as foam powder because they are typically contaminated with production contaminants such as plastic film or sheeting (often of polymers such as polystyrene or polyolefins such as polyethylene and polypropylene), plastic netting, or paper, which are used in slabstock production. These plastics may coat the grinding surfaces of the comminution equipment because of the heat generated during grinding processes. Paper contamination hinders comminution of foam, particularly when comminuting to obtain very small foam particles, because the grinding properties of paper are very different from those of polymeric foam. The papers may also be coated with a polymer. Large particles of these contaminants cause processing difficulties with subsequent foam production and cause quality problems with the resulting foam. These problems include: high viscosity of PUR-foam ingredients that include mixtures, such as slurries, of foam powder and active-hydrogen compounds, poor cell structure in the resulting foam, visibility of the larger foam particles, and poor quality and feel of the foam.

Foam scrap that is contaminated with adhesives is difficult to process using conventional techniques for comminuting and conveying the resulting foam pieces or foam powder. Adhesives often cause foam pieces or foam powder to adhere to each other and to conveying and/or processing equipment such as mills. Adhesives present in foam powder that is used to prepare new foam can destabilize the polymer foam during its formation.

Cost-effective improved techniques, methods, and equipment for processing polymeric foam to achieve improved integration of polymeric foam and foam powder processing steps, utilization of a wider range of foam compositions for comminution and re-use in new foam, improved control and reliability of processing equipment and methods, reduction of operating and materials costs and improvements in resource utilization are all desirable. Particularly, a need exists for improved processing techniques and devices for (1) comminuting polymeric foam including production contaminants such as polymeric foam skins, polymeric sheet, or paper, (2) preventing or reducing excessive heating of polymeric foam during comminution, (3) processing foam products containing a wide variety of production and consumer contaminants and (4) using foam powder prepared from polymeric foam including production and consumer contaminants as an ingredient in new foam.

None of the documents cited above disclose the inventive processes and foam products described herein.

SUMMARY OF THE INVENTION

This invention provides novel methods and devices for polymeric foam processing, particularly methods for comminuting (e.g., milling, pulverizing, or grinding) polymeric foams, preferably those containing with production and, perhaps, post-consumer contaminants. These novel methods and devices reduce excessive heating of polymeric foam during processing and improve the processing of polymeric foam products containing a variety of contaminants.

Polymeric foams containing production contaminants are comminuted on a two-roll mill. The resulting comminuted foam powder is quenched both to cool the comminuted foam powder and the comminution process equipment.

In one variation of the present invention, a novel collection chamber is employed variously for collecting polymeric foam powder from a two-roll mill and for quenching the comminuted foam powder by means of a gaseous cooling medium.

Another variation of the invention involves a novel sifter for screening polymeric foam powder. The device employs a cylindrical screening tube and beater bars for separating foam particles from larger foam pieces.

The PUR foam powder prepared from PUR foam containing production contaminants such as PUR foam skins, polymeric sheets (often of polyethylene, polypropylene, or polystyrene), and paper (perhaps coated) is subsequently used in the preparation of new PUR foam.

In yet another variation of the present invention, a novel energy optimizing method for a two-roll mill is employed wherein the fastest roll is driven, for example, by an electric motor while the slowest roll is indirectly driven by the first roll through friction between the two rolls.

In another variation of the present invention a novel feed rate control method is employed for controlling the rate at which polymeric foam pieces are fed to a mill. This novel method uses, e.g., the mill's power consumption, to control the rate at which conveying equipment feeds foam pieces to the mill.

The inventive procedure includes procedures for removing oil and grease from foam powder and either removing adhesive contaminants from polymeric foam powder or destroying the adhesive property of these contaminants.

BRIEF DESCRIPTION OF THE DRAWINGS

FIGS. 14A and 14B schematically depict the airflow through the screening device of FIG. 13A.

FIG. 14C shows an air controller on the screening device of FIG. 13A.

DESCRIPTION OF THE INVENTION

While describing the invention and its variations, certain terminology will be utilized for the sake of clarity. It is intended that such terminology includes the recited variations as well as all equivalent variations.

Overall Process

Figure 1:
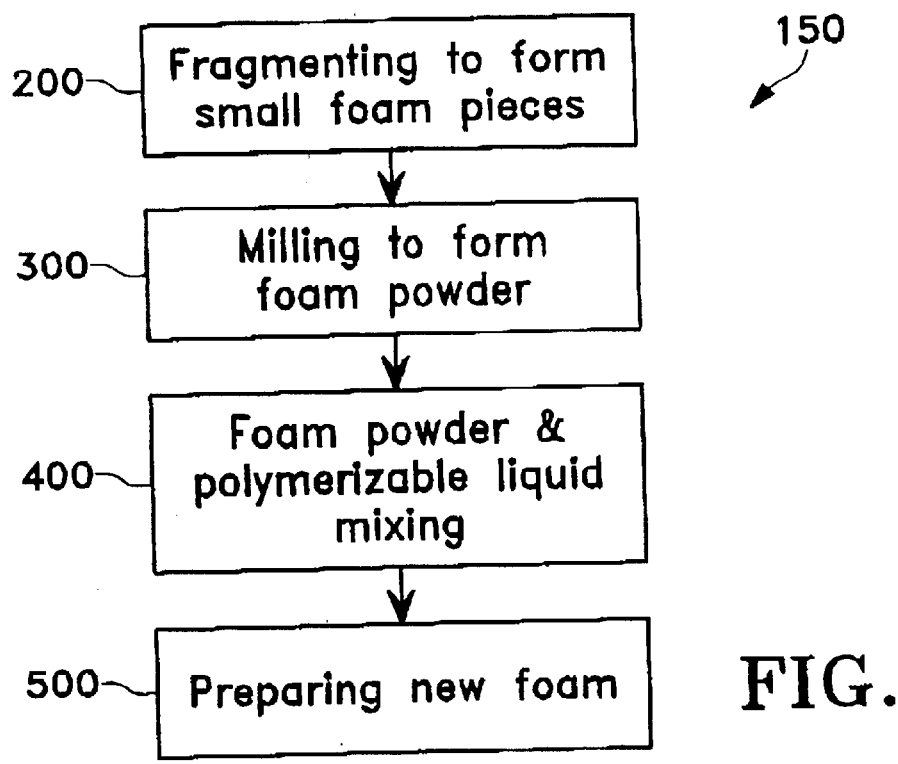
FIG. 1 is a block diagram schematically illustrating the generic polymeric foam powder process of this invention.

FIG. 1 shows a preferred variation of the inventive procedure in which an integrated process is employed for comminution of polymeric foams to prepare foam powder particles and subsequently incorporating the foam powder in newly formed polymeric foams. The various processing steps of this inventive process may be combined to function cooperatively to form an integrated process as is schematically illustrated in FIG. 1. FIG. 1 provides a summarized schematic illustration of an integrated process 150 having processing procedures 200, 300, 400, and 500. Each processing module includes one or more processing steps or sequences. Processing module 200 includes processes for fragmenting of articles containing polymeric foam, to prepare smaller foam pieces. This module comprises a first-stage comminution, as is described in more detail in connection with FIGS. 2 and 7. FIGS. 3, 4, 5, and 6 show configurations of equipment for conveying foam from one stage to another in the inventive process. Processing module 300 in FIG. 1 shows a second-stage comminution in which foam powder particles are prepared from the foam pieces resulting from the processes carried out in processing module 200. Module 400 depicted in FIG. 1, includes processes for preparing mixtures of foam powder and one or more polymerizable liquids. Optionally, mixtures of foam powder and polymerizable liquid may be comminuted using the methods of processing module 400, thereby providing a third-stage comminution of foam particles. Module 500 in FIG. 1 includes process steps for preparing solid polymeric foams by adding various ingredients to a mixture of foam powder and polymerizable liquid, and subsequently polymerizing the mixture to form a new foam that incorporates the foam powders of the present invention.

First-Stage Comminution

Figure 2:
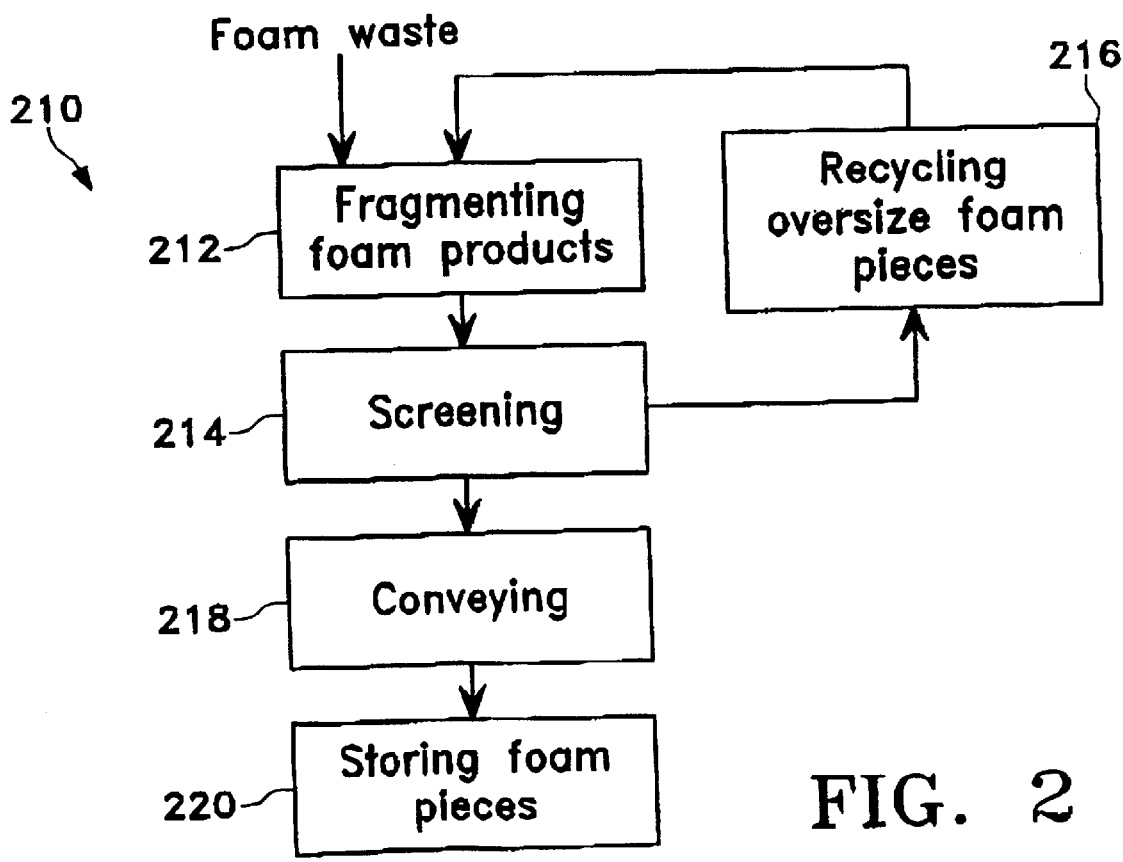
FIG. 2 is a flowchart schematically showing a fragmenting and screening portion of the process illustrated in FIG. 1.
Figure 7:
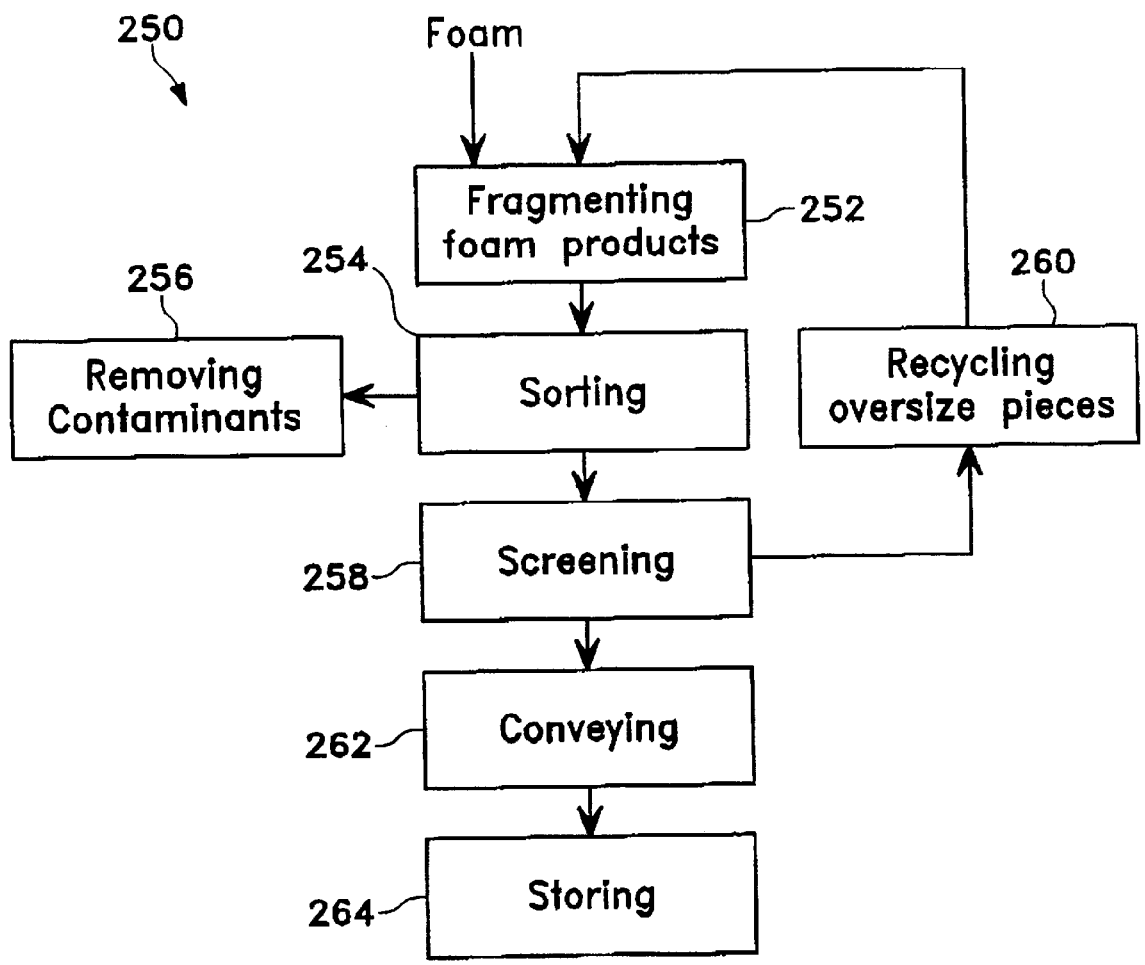
FIG. 7 is a flowchart schematically showing an alternative fragmenting and screening portion of the process illustrated in FIG. 1.

Processing module 200 (FIG. 1) includes processing sequence 210, shown in FIG. 2, and alternative processing sequence 250, depicted in FIG. 7. These two processing sequences generally differ in the types of polymeric foam products and foam articles that are fragmented in the first-stage comminution. Returning to FIG. 2, a first step 212 in processing sequence 210 includes fragmenting foam products and articles containing uncontaminated foam or foam articles that are contaminated with production contaminants only. The expression "uncontaminated foam" as defined herein, includes polymeric foam products or articles that are substantially free from production contaminants and other contaminants such as metal, wood, fiber, and other polymeric compounds. As mentioned above, the expression "production contaminants" includes materials that are typically present in the manufacturing of polymer foam, such as paper, plastic-coated paper, and polymeric films or netting as well as foam skins. Foam skins are layers of non-foam or very high density foam that are formed during the foam polymerization procedures. These plastic films are used to line the forms used to make the "buns" or "loaves" discussed above. The plastics used are typically polyolefins such as polyethylene or polypropylene, although other polymers are suitable. Suitable methods for foam fragmentation step 212 include size reduction using any of the technologies that are well known to those of ordinary skill in the art. Examples of size-reduction equipment suitable for fragmenting foam in step 212 (FIG. 2) include comminution equipment types such as roll crushers utilizing two rolls counter-rotating at different speeds, impact mills utilizing for example hammer crushers, shredders employing shredder teeth on a single roll or using sawtooth and counter-rotating spacer assemblies, ring mills employing hooked rings attached to a rotor spinning at a high speed, and ring-roller mills utilizing rollers in conjunction with grinding rings. Examples of preferred size reduction equipment for step 212 include rotary grinders, hammer mills, and shear shredders.

Should the polymeric foam be contaminated with adhesive, the foam should first be treated to remove the adhesive properties. This permits effective conversion of the foam scrap into foam powder. Appropriate treatment techniques include solvent washing or subjecting the adhesively contaminated foam to microwave, infrared, or UV radiation.

Foam products and articles are introduced (not shown) into the size reduction equipment of step 212 using any of the techniques that are well known to those of ordinary skill in the art such as feeding the foam articles manually into the fragmentation equipment or using hoppers and/or conveyors. It will be understood that a preliminary size reduction step (not shown) may be executed prior to step 212 in order to reduce the foam articles to a size that is suitable for the fragmentation equipment of step 212.

Desirably, the size of the small foam pieces resulting from step 212 is less than about 10 cm. Preferably, this size is less than about 2 cm. A specific size range is obtained by operating the size reduction equipment of step 212 at the required operating parameters, followed by a screening step 214 (FIG. 2). Foam pieces discharging from the fragmentation equipment of step 212 are screened in step 214 resulting in a target size, such as foam pieces no larger than about 10 cm, and oversize pieces including foam pieces larger than the target size. Suitable equipment for screening step 214 includes well known screening equipment using revolving, shaking, vibrating, oscillating or reciprocating screens. Oversize pieces are recycled to the fragmentation equipment in step 216 of processing sequence 210 (FIG. 2). Recycling step 216 includes the use of devices such as conveyor belts, conveying screws, or pneumatic conveying, i.e. conveying in a gaseous flow, to return these foam pieces to the fragmentation equipment of step 214. Foam pieces within the target size range are conveyed in step 218 to foam piece storing step 220, using such conventional conveying techniques as conveying belts, conveying screws, or pneumatic conveying. Typically, fragmentation equipment suitable for the present technology has built-in components for screening and recycling of oversize pieces (steps 212, 214, and 216).

Figure 3:
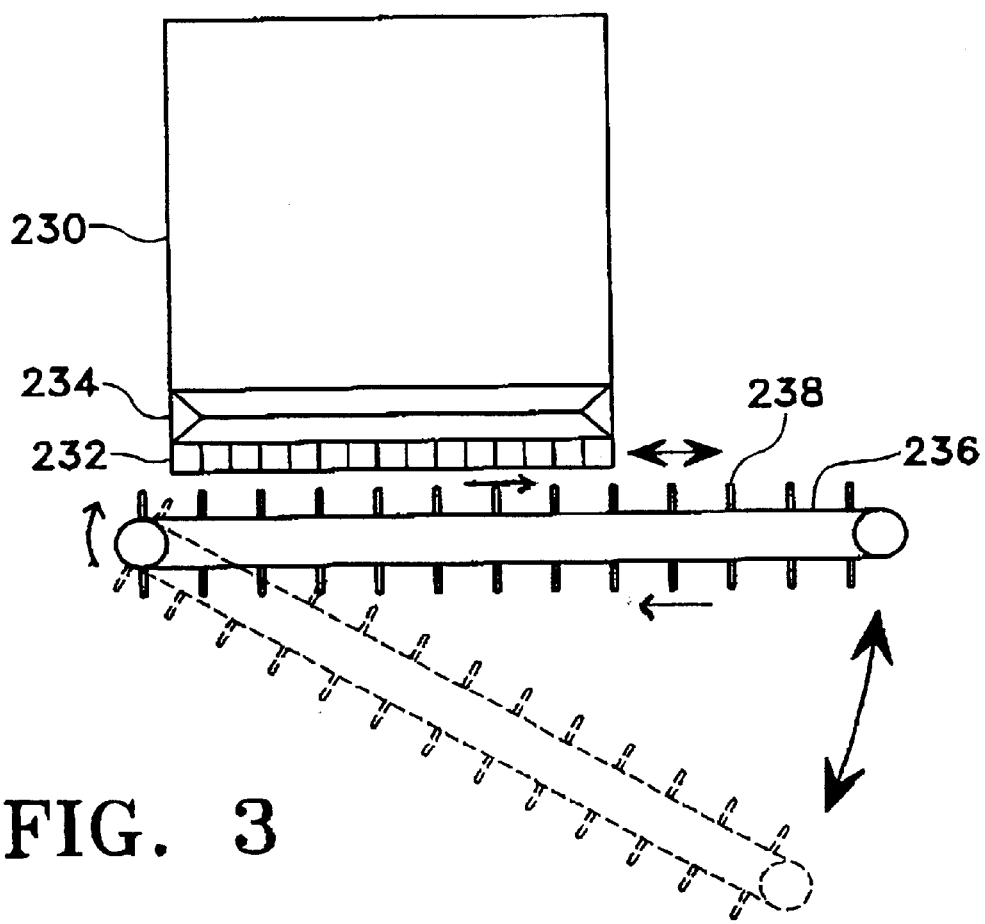
FIG. 3 shows a schematic view of a foam piece storage container having a discharge mechanism of the present invention.

Storage facilities for executing optional storage step 220 may include storage bins, boxes and silos such as are used for bulk solids storage. Preferably, a foam piece discharge method is provided according to the present invention for facilitating the discharge of foam pieces from the storage equipment of step 220, as compared with conventional discharge methods. Equipment adapted for executing the inventive discharge method is illustrated in FIG. 3. The inventive discharge method includes storing the foam pieces in a storage container 230, having a bottom section comprising a mechanically activated screen 232 employing for example vibrating, oscillating, or shaking movement, and preferably having a screen aperture, i.e. the size of the screen opening, exceeding the largest diameter of the largest foam pieces, i.e. the maximum size of the foam pieces, by at least about 2%. A flexible connection 234 can be provided between screen 232 and storage container 230 to facilitate mechanical activation of the screen. The inventive method additionally includes a conveying surface 236 moving underneath the screen.

Optionally, the moving conveying surface has protrusions 238 (FIG. 3) thereon, which reach in close proximity to the screen within a distance about equal to the dimension of the screen aperture. These protrusions may be brackets or flexible or rigid strips or bars mounted on the conveyer surface. Preferably, these protrusions extend from about 0.3 cm to about 7.5 cm from the conveying surface. The conveying surface may be inclined from the direction, or plane, parallel to the screen by an angle of 0° to 30° to provide for a consistent discharge rate from all parts of the storage container. We have found that the screen provides support for the material, i.e., the foam pieces, in the storage container and thereby reduces the weight of the material on the conveying surface and allows the use of simpler, more cost-effective, and less massive conveying equipment. The combination of the screen and the conveying surface prevent gravity-assisted flow of foam pieces from the storage facility when the conveying surface and the screen are not activated.

Figure 4:
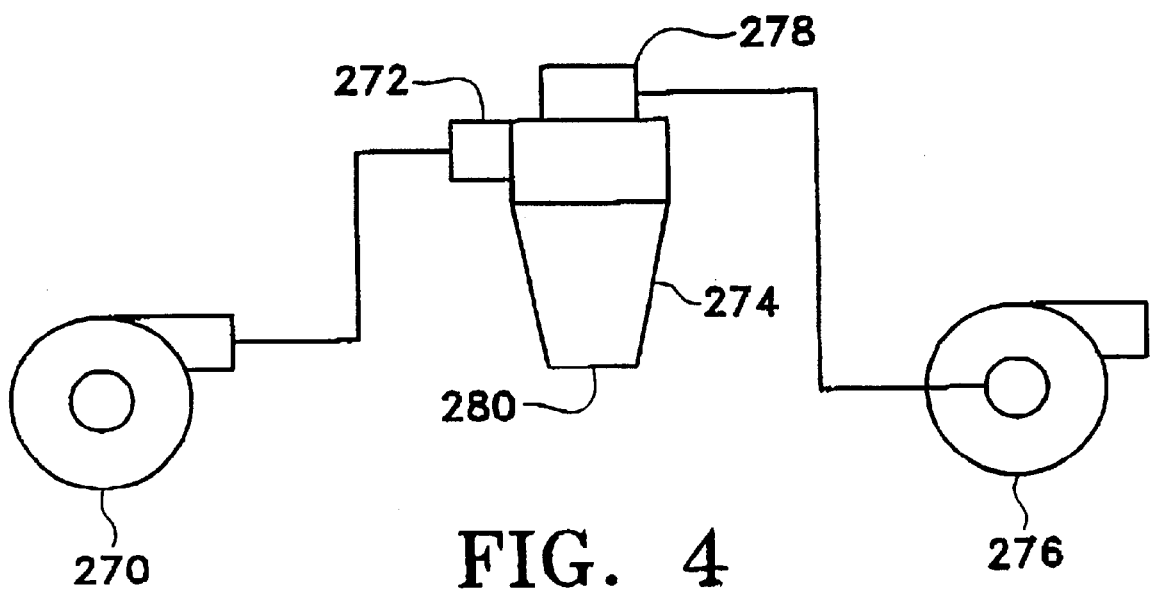
FIG. 4 shows a schematic view of a foam powder conveying system.

Returning for a moment to conveying step 218, one or more fans may be used to blow or to convey foam pieces through a conduit or duct in the inventive process by means of a gaseous flow. For example, two fans may be used in combination with a cyclone. Suitable equipment for conveying foam pieces or foam powder employing a cyclone and two fans are shown in FIG. 4. A first fan 270 communicates with inlet 272 of cyclone 274, feeding foam pieces or foam powder particles suspended in air into cyclone 274. A second fan 276 communicates with cyclone outlet 278 to remove air or other conveying gas from the cyclone through outlet 278. The fans are usually designed and operated such that an optimum downward pressure is realized in cyclone material outlet 280 to eliminate problems with plugging of the cyclone unique to handling foam pieces or foam powders. The downward pressure in the cyclone material outlet 280 may also be adjusted by changing the pressure in cyclone air outlet 278 with, for example, adjustable baffles, filters, a baghouse, or other restrictions. Both fans preferably use a so called "open-face" design.

Figure 5:
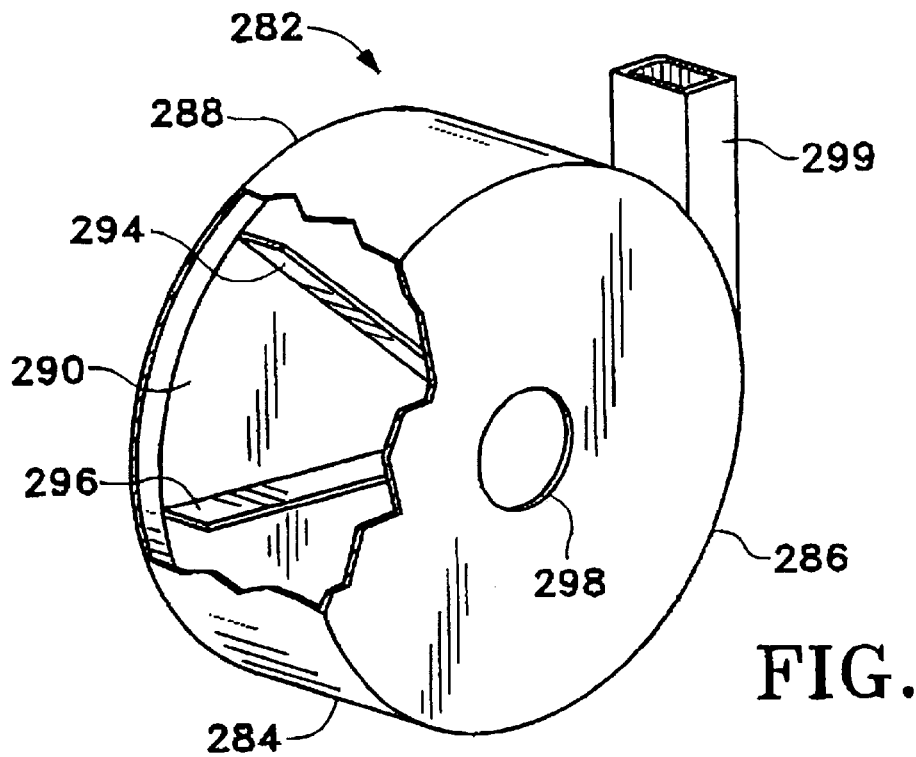
FIG. 5 shows a perspective view, with parts broken away, of an open-face fan.

FIG. 5 schematically illustrates an open-face fan 282. The fan has a substantially cylindrical housing 284, a front cover 286 and a rear cover 288. Inside the housing 284 is a disk shaped plate 290 mounted such that a drive mechanism (not shown) rotates the disk when in use. On the disk are mounted several paddle shaped vanes such as vanes 294 and 296. There is a substantial clearance between the vanes and the inside of front cover 286 resulting in an open-face design. An inlet is provided at opening 298 of front cover 286. An outlet 299 is provided at the outer perimeter of the cylindrical chamber. When disk 290 is rotated, a centrifugal action is provided for conveying air, or foam powder particles suspended in air, from inlet 298 to outlet 299.

Pneumatic conveying techniques often include steps for separation of the conveying gas from the material that is conveyed. A convenient place for doing so is at the point where the conveyed material is discharged from the conveying process. Cyclones may be utilized to remove the excess air but when foam is to be conveyed, foam pieces and foam powder may coat the inside walls of the cyclone. Additionally, foam pieces and foam powder are prone to plug the cyclone material outlet. Such coating and plugging difficulties associated with the use of foam in cyclones, can be alleviated by using an elongated flexible element 283, see FIG. 6, that is suspended from a top portion 285 of a cyclone 287 and that extends down and is attached to a cyclone material outlet 289 located at bottom 291 of the cyclone. Air flow inside the cyclone causes flexible element 283 to flex and move around inside the cyclone, continuously removing foam from the inside of cyclone walls 287 and from cyclone material outlet 289. Suitable materials for flexible element 283, include rope, plastic and rubber tubing or hose, plastic chain and metal chain. Most highly preferred is a rope comprised of an engineering polymer such as aromatic polyamide polymers, e.g., Kevlar. Air enters the cyclone at inlet 293 and is discharged through outlet 295.

Figure 6:
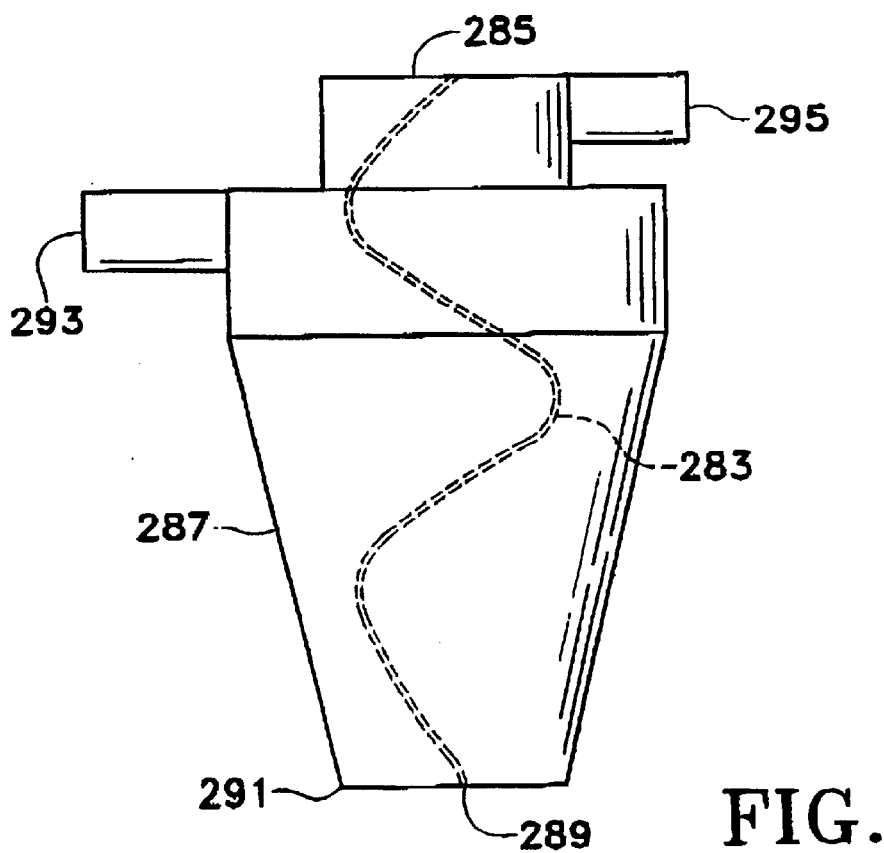
FIG. 6 is a schematic representation of a cyclone.

The conveying devices and procedure shown in FIGS. 4–6 and portions of them may be used in a variety of ways for conveying both foam pieces and foam powder among equipment shown herein.

Alternative First Comminution Step

As shown in FIG. 7, processing sequence 250 of process module 200 (FIG. 1) may be used on polymeric foam products and articles that are contaminated with, for example, wood, fiber, leather, ferrous and non-ferrous metals, plastics and glass, such as might be found in chairs, car seats, and the like. As mentioned above, we refer to this class of contaminants as "consumer contaminants" or "post-consumer contaminants." The foam-containing products and articles are fragmented in a fragmenting step 252, using size reduction equipment that may be similar to the equipment described in connection with foam fragmentation step 212 of processing sequence 210 shown in FIG. 2. It will be understood that the specific type of size reduction equipment in step 252 depends on the type of contamination. For example, metal contamination requires size-reduction equipment with a higher energy input and higher wear resistance than equipment associated with fabric contamination.

Subsequent to fragmenting step 252, the materials are sorted in a sorting step 254 to remove the noted contaminants in a contamination removing step 256. These sorting methods include any techniques that are well known to those of ordinary skill in the art. For example, ferrous metals may be removed via magnets. Non-ferrous metals can be magnetically separated following the induction of eddy currents in these metals. Post-consumer contaminants such as wood, fiber, leather, plastic and glass can be removed using conventional elutriation methods wherein the pieces are for example separated by gravity in an upwardly flowing gas, e.g. air, stream.

The foam pieces that are thus obtained may be screened and recycled according to size in steps 258 and 260 (FIG. 7), which are similar to steps 214 and 216 respectively of processing sequence 210 depicted in FIG. 2. Returning to FIG. 7, the target size fraction of the foam pieces is conveyed in a step 262 and stored in a step 264, wherein these steps are similar to steps 218 and 220 respectively of FIG. 2, including the inventive step of discharging the foam pieces from the storage equipment employing a mechanically activated screen described in connection with FIG. 3.

Milling Step Controller

Figure 8:
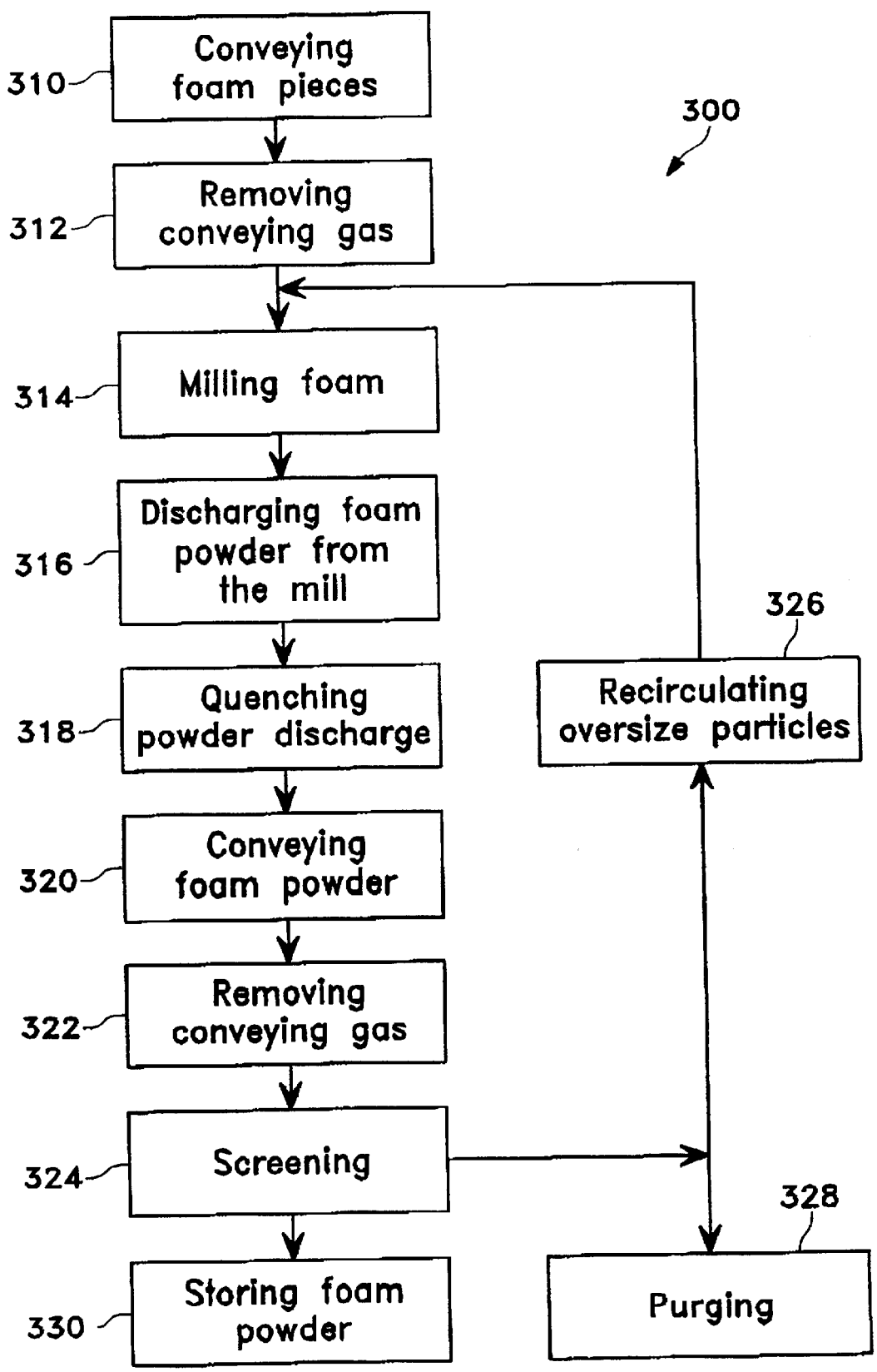
FIG. 8 is a flowchart schematically showing a comminution and screening portion of the process illustrated in FIG. 1.
Figure 9:
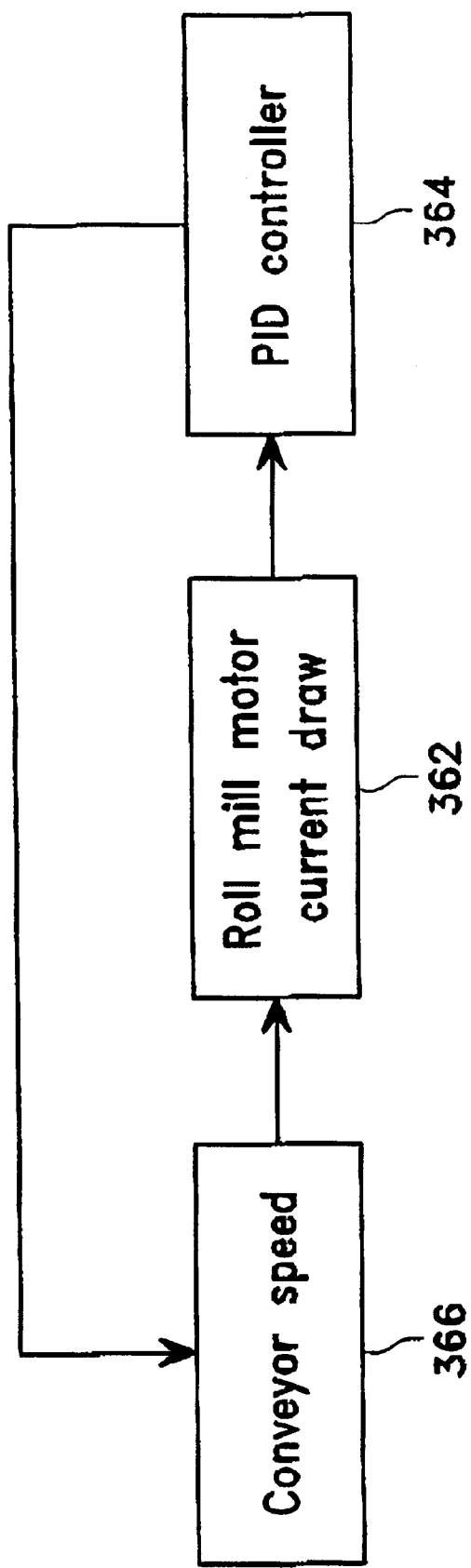
FIG. 9 is a flowchart schematically showing a technique for controlling conveyor speed by a roll mill.

As shown in processing sequence 300, illustrated in FIG. 8, foam pieces including production contaminants are conveyed in step 310 to a milling or comminuting step 314, optionally removing conveying gas as shown in step 312. Suitable conveying equipment includes the equipment described in connection with FIGS. 4–6. However, it is well known that it is difficult to dependably control the feed rate of foam pieces due to their low bulk density and tendency to bridge. According to the present invention, it has now been discovered that the mill throughput can be optimized using a conveying method wherein the rate of conveying is controlled by the comminution rate. In one variation of this technique, the power consumption of the mill is monitored during the comminution process. An electrical feedback technique is then employed to electrically couple the mill power consumption to the feed rate. For example, if an excessive amount of foam pieces is conveyed on the mill, increased mill power consumption typically results. The signal resulting from the HIGHER power consumption can be fed to the conveying equipment, causing the conveying equipment to reduce the conveying rate of foam pieces to the mill. Similarly, when the feed rate of foam pieces to the mill is too low, the mill typically uses less power. The mill's reduced power signal can then be fed back to the conveying equipment, causing it to increase the conveying rate. The correlation between mill power consumption and foam feed rate may be determined experimentally for different types of foam. The novel mill feed control method is illustrated in FIG. 9, wherein the roll mill motor current draw signal 362 is fed to a PID (proportional-integral-derivative) controller 364, which then controls conveyor speed 366. PID controllers and the technology for using PID controllers are well known to those of ordinary skill in the art.

In addition to the use of roll mill current draw or power consumption as the measure of foam conveyance rate to a mill, other similar indicia may be employed. For instance, when hydraulic motors are used to power the conveying devices, hydraulic pressure or hydraulic fluid flow rate may be used.

Process-Contaminant-Containing Foam Powder

Foam pieces resulting from the methods of processing module 200 are comminuted employing a comminution step 314, see FIG. 8, to prepare a foam powder preferably having a particle size of about 2 mm or less, preferably less than about 0.25 mm, but likely larger than about 0.001 mm, e.g., 0.005 mm, including size ranges such as 0.001 mm to 0.010 mm, 0.001 mm to 0.020 mm, 0.001 mm to 0.045 mm, 0.001 mm to 0.150 mm, 0.005 mm to 0.010 mm, 0.005 mm to 0.020 mm, 0.005 mm to 0.045 mm, 0.005 mm to 0.150 mm, and any sub-ranges of these values. It will be understood that foam powder having a particle size of 2 mm or less contains the broken parts of foam bubbles or cells without any substantial volume fraction (e.g., less than about 7.5%, preferably less than about 5%, and most preferably less than about 2.5% by volume) of complete cells or bubbles. Preferably, a majority (or all) of the particles are of such a size that, when viewed on a particle-by-particle basis, do not have elongated sections left from the microscopic foam structure jutting from a central junction. This comminution step is a second-stage comminution in the inventive process. We have found that polymeric foam that is contaminated with production contaminants such as polymeric foam skins, paper, and plastic film or netting may be effectively comminuted on a two-roll mill employing a quenching technique for rapidly cooling the discharged foam powder. The comminuted foam powder, in the noted particle ranges, may contain as much as 75% (by weight) of polymeric foam skins or smaller amounts, including the ranges of 20% to 60%, 20% to 50%, 20% to 65% and any sub-range up to that 75%. It is an advantage of this process that extremely large amounts of those polymeric foam skins and other production contaminants may be included and yet the small particle sizes of the foam powder attained.

The resulting material, the foam powder, may comprise or consist essentially of particles of PUR foam and any one or more of the production contaminants. We have found that the process is quite consistent in producing comminuted foam particles having any one of the production contaminants. Desirably, the foam powder is produced from at least some flexible pur foam, preferably 5% or 10% by weight or more, but containing little if any rigid or semi-rigid foam. Of course, it is possible to accrue the benefits of the process using the rigid and semirigid foam, but other processes deal suitably with rigid foams.

Quench Milling Step

Foam powder is discharged from the mill in discharging step 316, depicted in FIG. 8. Comminution of polymeric foam on a mill such as a two-roll mill causes the temperature of the foam to increase as it passes through the grinding zone. For example, comminuting foam can raise the foam temperature as high as 150° C., which is above the softening temperature of commonly used thermoplastics such as polyethylene, polypropylene, polystyrene, and the like. Such temperature increases can result in thermal degradation of the polymeric foam, particularly when the foam is subjected to several passes through the mill. For example, the softening temperature of high-density polyethylene is about 135° C. The softening or melting of thermoplastic materials during comminution results in reduced mill efficiency since those materials will tend to adhere to the mill surface or agglomerate to form hard flakes or lumps during comminution. In addition, increased temperatures affect the comminution characteristics of the foam. For example, at those temperatures, PUR foam and/or foam powder will form a layer on the mill rolls. Although internally cooled mill rolls provide some beneficial cooling, they generally do not provide the desired level of cooling. We have found that if we "quench" the foam powder product as it exits the roller surfaces, the cooled foam powder does not agglomerate nor does it stick to the rollers. Specifically, it is highly desirable to direct the cooling medium directly at the nip between the two rollers to achieve a maximum benefit of the procedure. Likely, there is also a direct and/or indirect heat transfer effect on the rolls themselves. By "quench" we mean that the difference in temperature between the foam powder and the cooling medium is from 5°–10° up to 125° C., preferably between 25° C. and 125° C., and most preferably between 50° C. and 100° C. Preferably, the cooling medium is introduced at a temperature less than 115° C. It is also highly desirable that the cooling medium be introduced onto the foam powder product as it exits the roller surfaces e.g., at the nip between the rollers, in turbulent flow and further, the resultant mixture of foam powder and cooling medium be in turbulent flow. Preferably, the mass flow rate of the cooling medium has a value that is at least 3% of the mass flow rate of the foam powder product. For most of the powder produced by this process, this value is also the minimum value suitable for dilute phase pneumatic conveying. More preferably, the mass flow rate of the cooling medium has a value that is at least 30% of the mass flow rate of the foam powder product.

In the present invention, a gaseous cooling medium such as make-up conveying air is preferably injected or sucked into the pneumatic conveying system to quench the foam powder in step 318 as the foam powder is discharged from the mill. Alternatively, the gaseous cooling medium such as air can be added to the pneumatic conveying system anywhere within the recirculation loop. A preferred method of adding the air is to provide an inlet for air with a baffle for flow control in a section of duct with pressure less than atmospheric pressure, for example, before a fan. For instance, we have found that for net foam comminution rates of about 450 kg/hr (990 lb./hr.) employing quenching air flow rates of about 42.5 m³/min (1500 cu. ft./min.) air at ambient temperature in a duct with a diameter of 20 cm (8 in.) results in a highly turbulent flow providing effective cooling of the foam powder. Again, the cooling medium flow preferably is in turbulent flow.

Examples of suitable cooling media include: gases such as air, nitrogen, carbon dioxide or mixtures of these gases, gases such as these that additionally include droplets or vapor of liquids such as water, alcohols, ketones, alkanes, or halogenated solvents. The droplets are added for evaporative cooling. Preferably, droplets used in these media should have a droplet size of about 0.06 mm or less. It is also preferable to cool the gaseous cooling medium to a temperature below ambient prior to using in the present process.

Figure 10A:
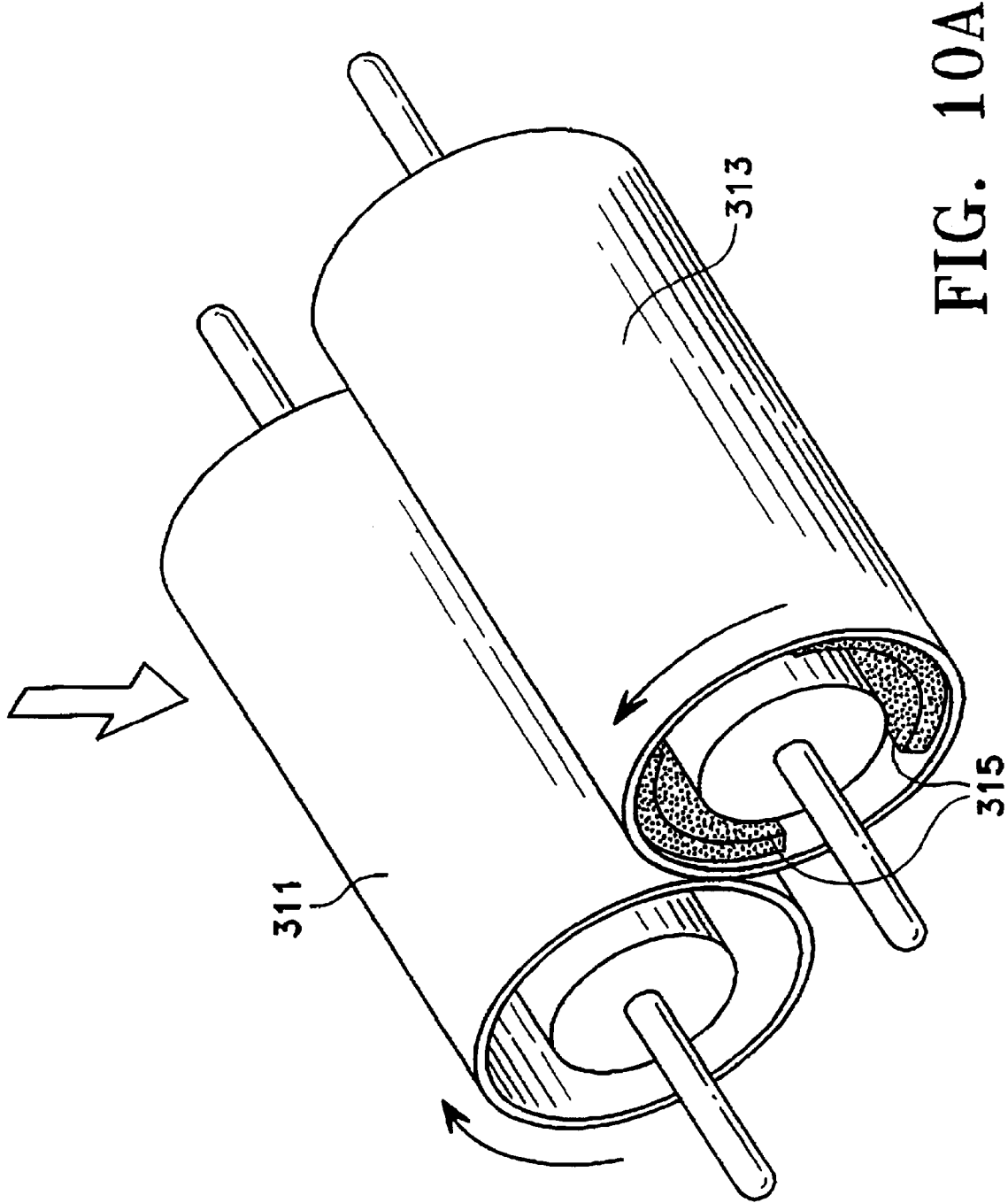
FIG. 10A shows an inventive differential speed roll mill device.
Figure 10B:
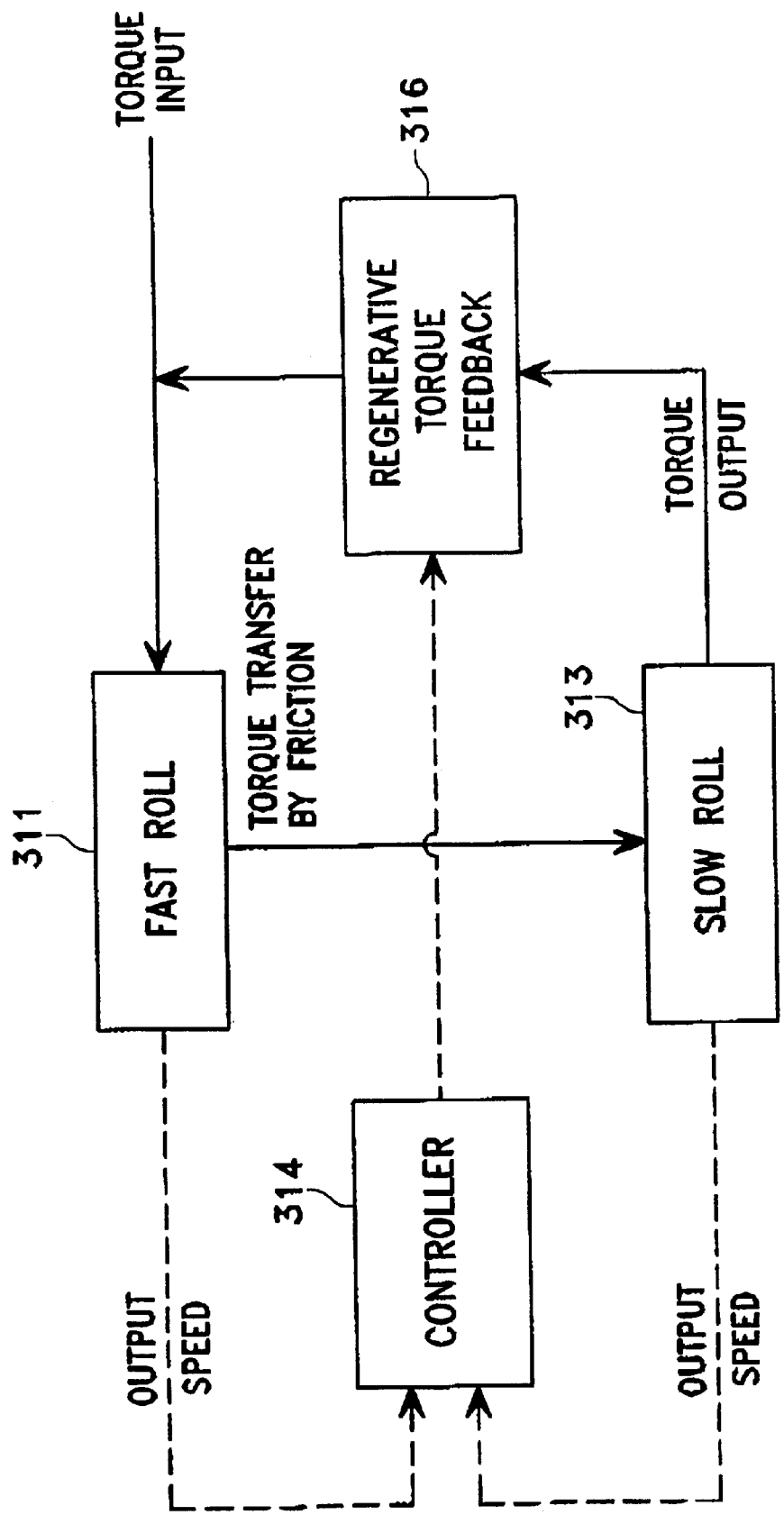
FIG. 10B shows a controller suitable for controlling the differential speed roll mill device of FIG. 10A.

Before proceeding to a discussion of the quenching concept, the comminution step is considered. Comminution step 314 may be carried out by using an inventive two-roll mill as shown in FIGS. 10A and 10B. FIG. 10A shows a pair of rollers: a faster, driven roll 311 and a relatively slower roll 313 that is driven by the fast roll 311. By "faster" and "slower" in this context, we refer to the relative surface speeds of the rolls. There is a differential speed where the rolls meet and shear the foam between them. In this variation of the invention, the fastest roll 311 may be driven by an electric motor or the like (not shown), while the second roll 313 is indirectly driven by the first roll through the friction between the directly driven roll and the material in the nip between the two rolls.

The speed reduction on the slow roll 313 may be achieved by mechanical braking in the depiction in FIG. 10A using brake shoes 315 in order to maintain the desired speed ratio between the two rolls. Of course, the speed reduction may be obtained with the generation of electrical or hydraulic power. We have found that the differential in surface speed between the two rolls vastly improves the efficiency of the comminution step. The ratio of the respective surface speeds may be between 10:1 and just above 1:1, preferably between 10:1 and 3:1, more preferably between 8:1 and 3:1, and most preferably between 5:1 and 3:1. The peripheral speed of the rolls is generally 0.1 to 10 m/s, preferably 0.1 to 4.5 m/s, and most preferably 0.1 to 3.0 m/s.

FIG. 10B shows a schematic outline of a control scheme for the FIG. 10A device in which torque output from the slow roll is monitored by controller 314 and used to control torque feedback from the slow roll 313 to the fast roll 311 in order to maintain a desired differential in the roll speeds.

On to the quench feature of this inventive device.

Figure 11:
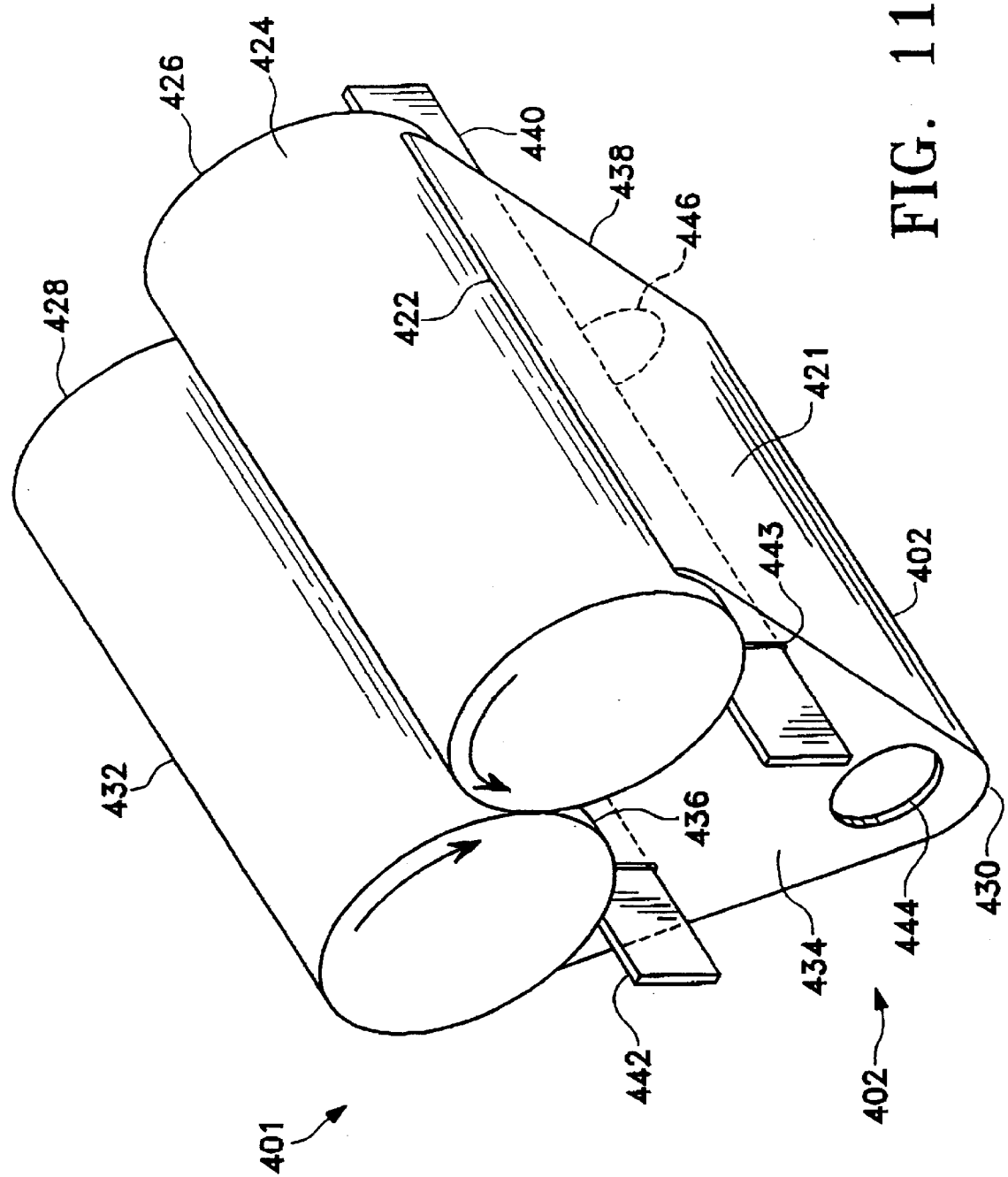
FIG. 11 shows a schematic perspective view of a collection chamber of the present invention utilizing the quench process.
Figure 12:
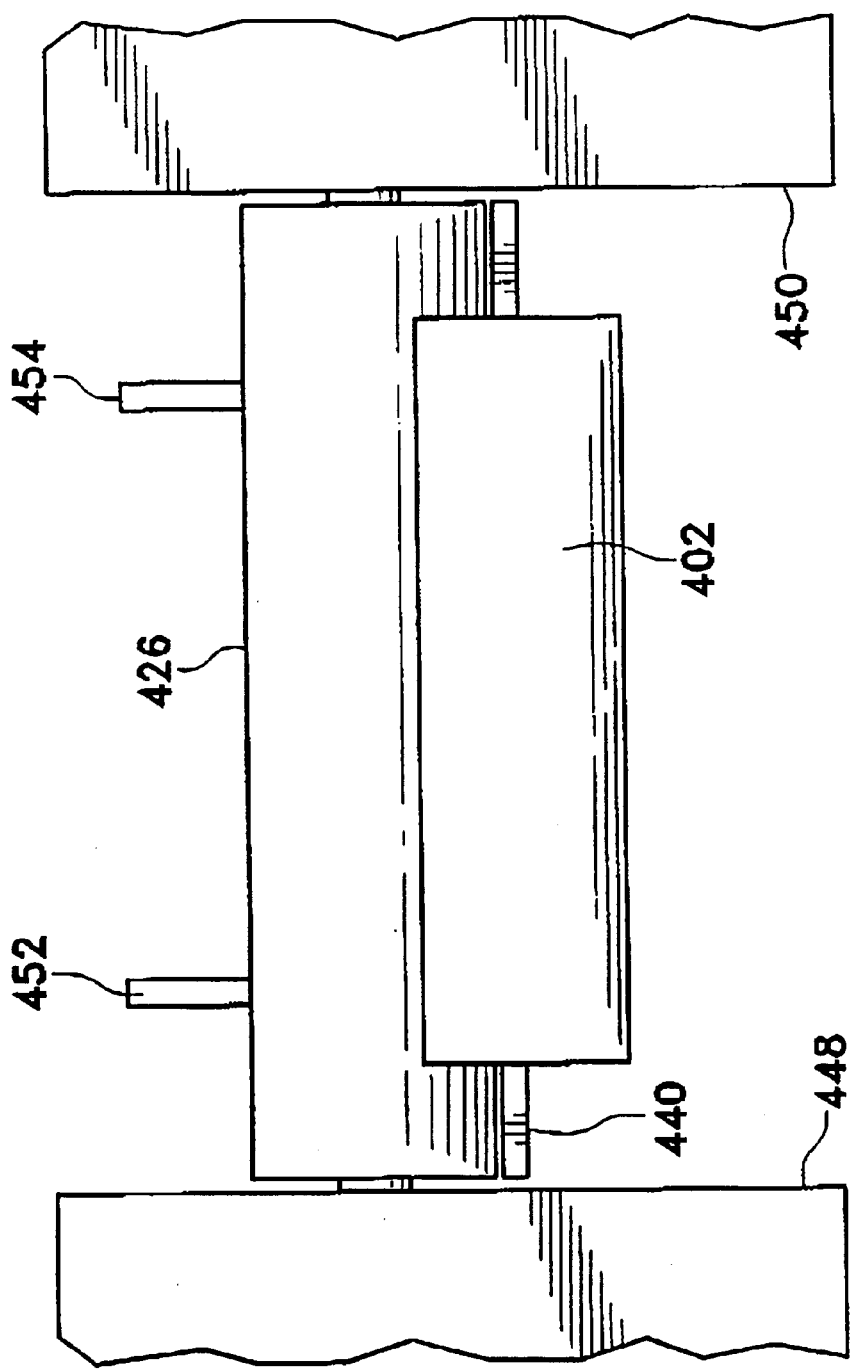
FIG. 12 is a schematic view of the positioning of the collection chamber illustrated in FIG. 11.

An example of a quench feature is employed in the FIGS. 11 and 12. The quench is found in collection chamber 402. First side wall 421 of the chamber 402 has an edge 422 that is positioned in close proximity to cylindrical surface 424 of first roll 426 of a two-roll mill having a second roll 428. Edge 422 is substantially parallel to cylindrical surface 424. A chamber bottom 430 connects side wall 421 with a second side wall (not shown) having an edge (not shown) that is positioned in close proximity to cylindrical surface 432 of second roll 428. A first end wall 434 connects the two side walls. This end wall has an edge that is positioned in close proximity to cylindrical surfaces 424 and 432. End wall 434 is substantially perpendicular to cylindrical surfaces 424 and 432. A second end wall 438 similar to the first end wall 434 is positioned opposite the first end wall. Preferably, the edges of the side walls and the end walls are snugly fitted to the rolls to avoid any substantial gaps between the rolls and the edges. Preferably, the edges of the side walls 422 and end walls 436 are provided with a rim made from a material that is softer than the rolls, for example a polymeric material, in order to closely fit the rolls without causing damage to the surface of the rolls.

Scraper bars 440 and 442 are positioned such that they contact (or nearly contact) cylindrical surfaces 424 and 432 respectively. The scraper bars are intended to remove substantially all of the foam that may adhere to either of rollers 426 and 428. Our process operates in an optimum fashion when substantially all of the comminuted foam falls into the lower chamber. The scraper bars can be fitted through slots, such as slot 443, in the end walls of the chamber. Inlet 444 in end wall 434 is provided for introducing a gaseous cooling medium while outlet 446 in end wall 438 provides a discharge for polymeric foam powder that is discharged when polymeric foam pieces are comminuted on rolls 426 and 428. It will be understood that the positioning of the inlet and outlet are merely illustrative. Alternatively, the inlet and/or the outlet can be positioned in the side walls or in the bottom of the chamber. Alternatively, an auger can be mounted in the bottom of the chamber, for example in alignment with inlet 444 and outlet 446 to assist in discharging foam powder from the chamber.

As shown in FIG. 12, the rolls of a two-roll mill, such as roll 426 are commonly mounted in side brackets 448 and 450 of the mill. Chamber 402 is mounted (not shown) to the side brackets using such mounting means as are well known to those of ordinary skill in the art. In an alternative design (not shown) the chamber can extend along the entire length of the rolls if side brackets 448 and 450 are adapted to provide space for access to inlet 444 and outlet 446. Scraper bars such as scraper bar 440 are mounted to side brackets 448 and 450. Alternatively, the scraper bars can be mounted to chamber 402. Preferably, the scraper bars are mounted in adjustable positions to provide an effective fit with the mill roll surfaces. Typically, rolls 426 and 428 are provided with guides, such as guides 452 and 454 (FIG. 12) to keep the foam away from the ends of the rolls.

As noted in FIG. 8, the foam powder is conveyed from the quenching step 318 in a conveying step 320. Pneumatic conveying procedures and devices such as shown in connection with FIGS. 4–6 may be used to convey foam powder to a foam powder screening step 324. When pneumatic conveying is utilized, it is preferable to separate the foam powder in a conveying gas removal step 322 (FIG. 8). Conventional cyclones may be used in step 322, but it is preferable to use a cyclone such as described in connection with FIG. 6.

The foam powder may be screened using any of the conventional types of screening devices described in connection with screening step 214 of processing sequence 210 shown in FIG. 2.

Returning to FIG. 8, oversize foam particles are returned to comminution step 314 through a recirculation loop in step 326. Typically, step 326 includes pneumatic conveying and the use of a cyclone (not shown) to separate the recirculated foam from the pneumatic air, using a conventional cyclone, or a cyclone such as is described in connection with FIG. 6, in recirculating the oversize foam particles to comminution step 314, shown in FIG. 8. Also, it is advantageous to discharge oversize particles through an optional novel purging step 328 when the oversize fraction contains a significant quantity of materials that are generally either post-consumer contaminants and/or contaminants that are difficult to pulverize in comminution step 314. Purging of the recirculation loop is accomplished through a device or component that is adapted for removing material from the loop, such as a diverter valve (not shown).

Sifter

In any event, foam powder screening step 324 (FIG. 8) is preferably carried out in inventive screening device or sifter 374. FIGS. 13A, 13B, 14A, 14B, 14C, and 15 show an inventive foam sifter that reduces or eliminates many of the processing difficulties associated with the conveying and handling of foam powder, those difficulties including coatings on the processing equipment, the blinding of screens, and bridging. As will be described in greater detail below, inventive sifter 374 has several significant benefits that derive from its mechanical design. In particular, the use of the rotating beater bars in close proximity to the cylindrical screen unit allows high efficiency sifting, the placement of the screen close to the sifter housing in conjunction with the use of vacuum promotes very high speed flow in a semi-circumferential flow around the screen unit carrying the tenacious foam powder away form the screen, the axial flow of air through the screen unit carries the larger pieces of foam without bridging or binding, and the design of the sifter screen permits adjustment on the fly.

Figure 13A:
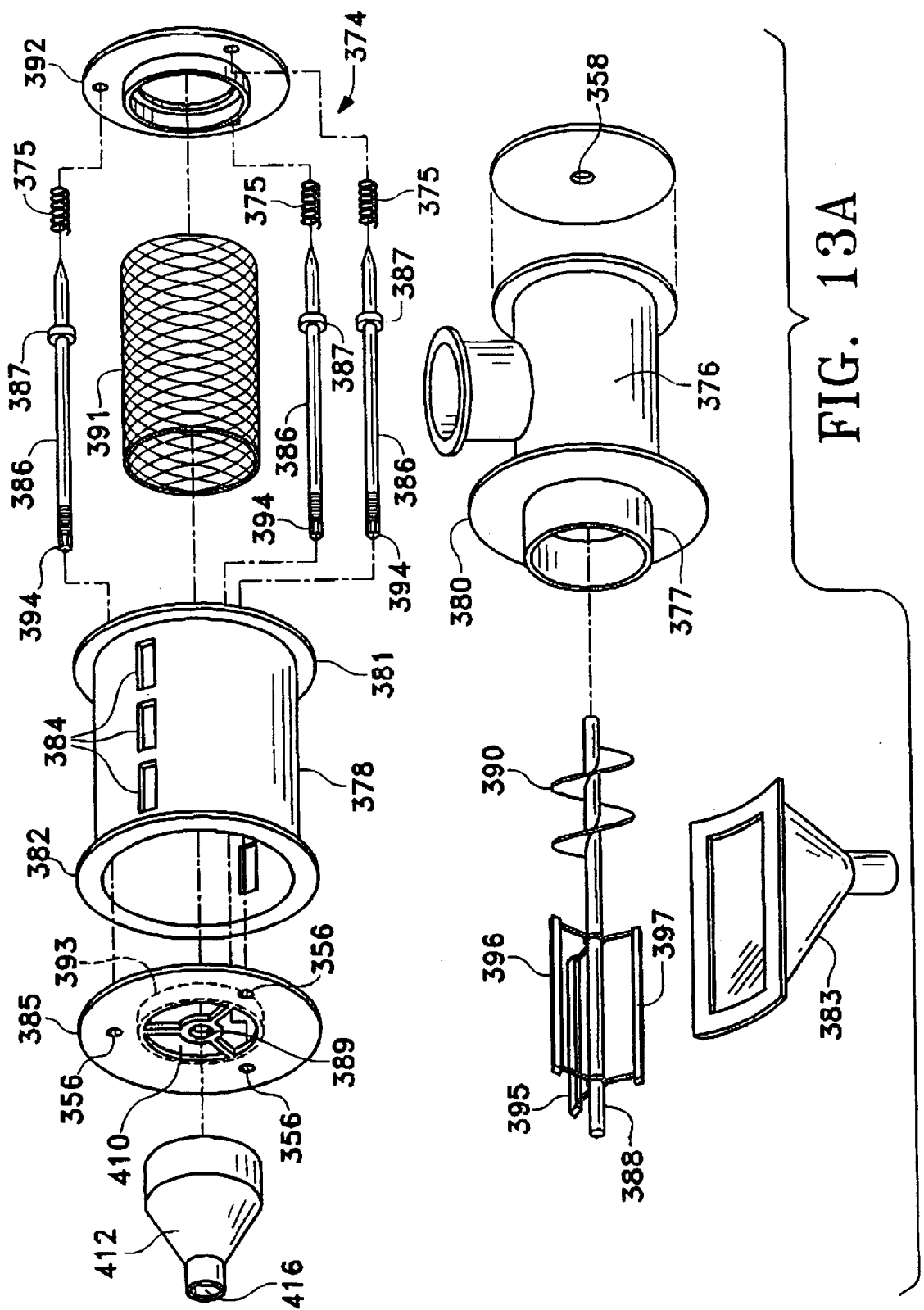
FIG. 13A shows a perspective, exploded view of the inventive screening device.
Figure 13B:
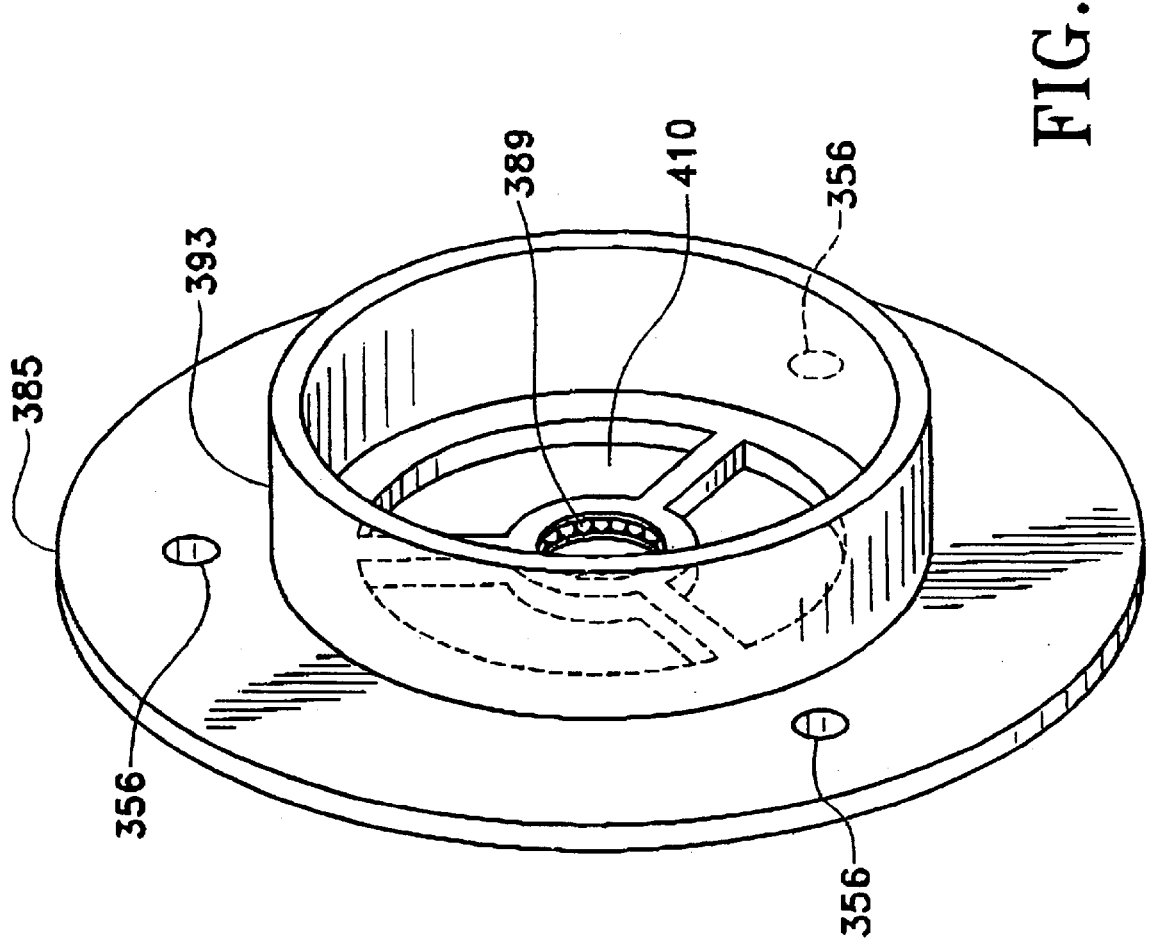
FIG. 13B shows a perspective view of the a flange shown in FIG. 13A.

FIG. 13A shows a perspective, exploded view of the inventive sifter 374. The inventive device includes a foam powder inlet section 376, and a screen housing 378 by a flange 382. A flange for attachment of screening tube 393 is attached to flange 385. Threaded rods 386 (perhaps three or more) are movably attached to screen tensioning flange 385 via threaded holes 356. The threaded rods 356 may have wrench flats or the like with shoulders 387 that support springs 375 at the other end. The details of screen tensioning flange 385 are shown in FIG. 13B. The springs 375 are compressed between shoulders 387 and ring flange 392. Ring flange 392 is movably supported over flange 377 of foam powder inlet section 376. The ring flange 392 is provided with a second flange for attachment of screening tube 391 positioned opposite flange 393. The threaded rods 386 may be turned as the sifter operates. By turning rods 386, the ring flange 392 moves axially along flange 377 and thus provides axial tension to screening tube 391. Springs 375 provide a passive mechanism for maintaining the tension on the screening tube at an approximately constant level as the screening tube 391 stretches or relaxes.

An axle 388 is positioned substantially along the central axis of housing 378 such that it extends from screen tensioning flange 385 through housing 378 and inlet section 376. Axle 388 rotates and is centered using, e.g., a bearing 358 in inlet section 376. A drive mechanism, e.g., electric motor, steam turbine, etc. perhaps with attendant gearbox, is rotates axle 388. Axle 388 is supported in a bearing 389 that is attached to tensioning flange 385, for example using a spider bearing. Bearing 389 is preferably chosen so that the axle 388 may slide axially within. This allows the bearing 389 to be an integral part of screen tensioning flange 385, simple assembly and disassembly of the unit, and simple access to the bearing for service or replacement.

The area surrounding bearing 389 within tensioning flange 385 provides a foam powder discharge outlet 410. A foam powder discharge collection cap 412 (FIG. 13A) is provided to receive the coarse particles—that may comprise fine foam powder, coarse foam powder, and foam pieces—which are discharged through foam powder discharge outlet 410 and funnel them to coarse foam powder outlet 416. Cap 412 is mounted such that a gap 414, having an adjustable width (shown below and discussed in more detail with respect to FIG. 14B), is situated between flange 385 and the cap.

A foam powder feed mechanism 390 such as a screw or auger is mounted to axle 388. Feed mechanism 390 extends into housing 378. Central to the operation of this device is a generally cylindrical screen assembly or tube 391. Screen assembly 391 is made up of a suitably sized screen material and generally will be attached to flanges or rings 392 and 393 to provide overall cylindrical form to the screen assembly 391 and to provide attachment points for mounting and stretching of the screen. Flange 393 of the screening assembly is attached to tensioning flange 385.

Suitable screening materials include organic fabrics such as polyester and nylon as well as metal such as stainless steel mesh. A typical screening tube has a length-to-diameter ratio of in the range of 0.1 to 3, preferably in the range of 0.2 to 2.

Situated on the axle 388 is a beater assembly that is positioned inside the screening tube 391. The beater assembly includes one or more beater bars 395, 396, and 397 that are attached to and rotate with axle 388. The beater bars are generally positioned substantially parallel to the interior of the screening tube 391 and to the axis of the axle 388. Of course, the beater bars may be helical with respect to the axle 388 at an angle of zero degrees to 60 degrees to the axle 388. The beater bars are preferably adjustably attached to the brackets in order to provide for an adjustable gap width between the bars and the interior of screening tube 391. The beater bars may be constructed of a variety of materials such as metals, rubber and plastic, or a combination of materials such as metal and rubber.

FIGS. 14A, 14B, and 14C depict various aspects of the operation of the inventive screening device. In FIG. 14A, a vacuum or suction is applied to the outlet of foam powder discharge outlet 383. This suction, in turn, draws gas flow through the annular space between screen 391 and screen housing 378. Screen 391 and screen housing 378 are in close proximity, e.g., a spacing of 2 inches or less in many instances, and this proximity provides a high speed gas flow through that annular space thereby carrying away any foam particles or foam powder that has passed through the screen 391. The average gas velocity around the semi-circular path in the noted annular space is between 2,500 and 6,500 feet per minute (fpm), preferably between 4,000 and 5,500 fpm, and most preferably about 4,500 and 5,000 fpm. This gas flow is generally considered to be somewhat isolated from the gas flow through the center of the screening assembly 391.

FIG. 14C shows an optional variation, which enhances the ability of the device to remain clog-free. We have found that by "activating" or shaking the screen material, for example by a vibrating or flexing the screen material of screening tube 391, the screen remains generally free of the blinding problems commonly associated with screening foam powder. A vibrating movement may be obtained by subjecting tube 391 to a pulsed air flow resulting in a screen vibration having a frequency preferably ranging from about 0.01 Hz to about 1000 Hz. Such a pulse flow may be caused by a variety of devices. FIG. 14C shows an inventive way to cause such pulsing. A freely rotating plate 353 is situated in slot 384. As air is pulled past the plate, it rotates and momentarily limits gas flow into the slot 384 as it closes the slot. As it continues to rotate, it opens and allows gas flow. Rotation at high speed causes flutter in gas rate and consequent oscillation of the screen 391. Of course, it is also contemplated that such a rotating plate may be placed in the sifter outlet (e.g., foam powder discharge outlet 383 or coarse foam powder outlet 416) or in the gas ducts leading to (e.g., foam powder inlet section 376) or away from the sifter. The rotating plate 353 may also be driven, for example with an electric motor, at a frequency from about 0.01 Hz to about 1000 Hz.

FIG. 14B depicts the other major gas flow through and along the axis of the screen assembly 391. In this instance, a vacuum or suction is applied to the outlet 416 of discharge funnel 412. This results in flow both though the interior of screen assembly 391 and through the slot 414 provided at the edge of end funnel 412. This "staging" of gas flow allows the larger foam pieces to progress more slowly through the interior of screen assembly 391 towards the discharge end whilst being beat upon by the beater bars. Yet as the foam pieces leave the screen assembly 391, the added gas flow entering through slot 414, in combination with the decreased cross-sectional area in discharge 416, forcefully carry the larger foam pieces out of the unit 374. The staging of gas flow substantially eliminates the possibility of bridging in the inventive sifter 374.

Clearly, the size of the slots 414 shown in the FIG. 14B may be adjusted by moving the discharge funnel 412 with relation to the flange 385. Proper slot adjustments will, for instance, prevent the foam powder from being "by-passed" into the discharge funnel 412. In this manner, an optimum residence time of material within the screen assembly can be obtained. Likewise, slots 384 may be made adjustable to effect proper airflow around screen 391.

Figure 15:
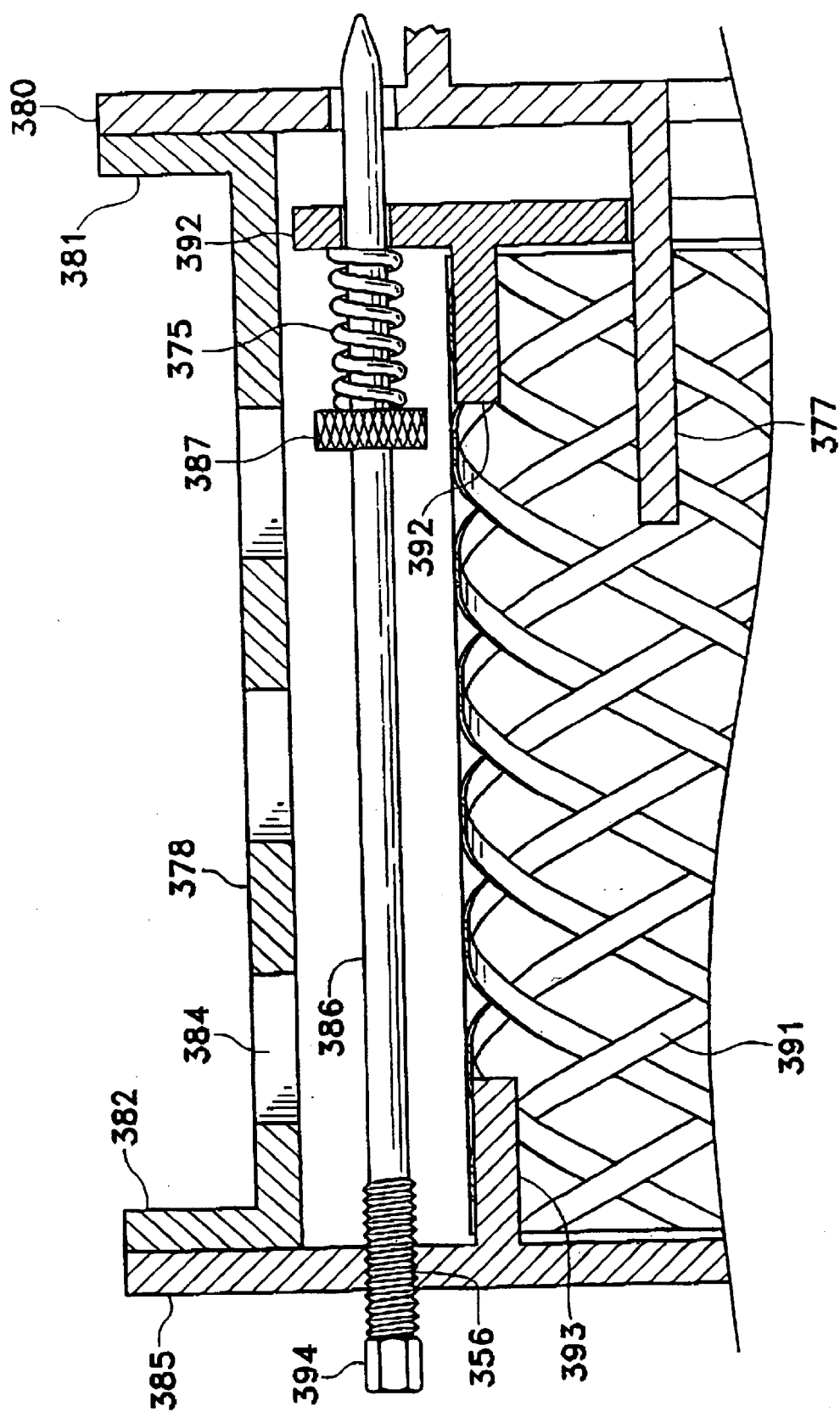
FIG. 15 depicts the screen-tension adjustment mechanism for the sifter screen of FIG. 13A.

Another useful aspect of the invention is shown in FIG. 15. As the inventive device is used, the screen material of screening assembly 391 stretches and may begin to flap or to flutter. This may cause early failure of the screen material. Too much slack in the screen may allow interference with the beater bars with generally catastrophic results. The operating tension of our sifter screen 391 may easily be adjusted by use of the threaded adjusting rod 386 shown in FIG. 15. The process need not be shut down for this adjustment.

To optimize the operation of the inventive screening device 374, we have found that it is preferable to screen mixtures of both fine and coarse foam powder and foam pieces such that the mixture has a particle size range such that less than about half of the feed material comprises particles that are small enough to pass through the screen and the major portion of the feed material comprises foam particles having a particle size that doesn't pass through the screen. Qualitatively speaking, the beater bars via the larger particles "wipe" the screen and push the smaller particles through the screen openings.

Foam particles in the target size range are discharged from the screening equipment of step 324 (FIG. 8) and may be conveyed to an optional storage step 330. Again, the foam powder is preferably conveyed by the pneumatic conveying and separating devices shown in FIGS. 4–6.

Figure 16:
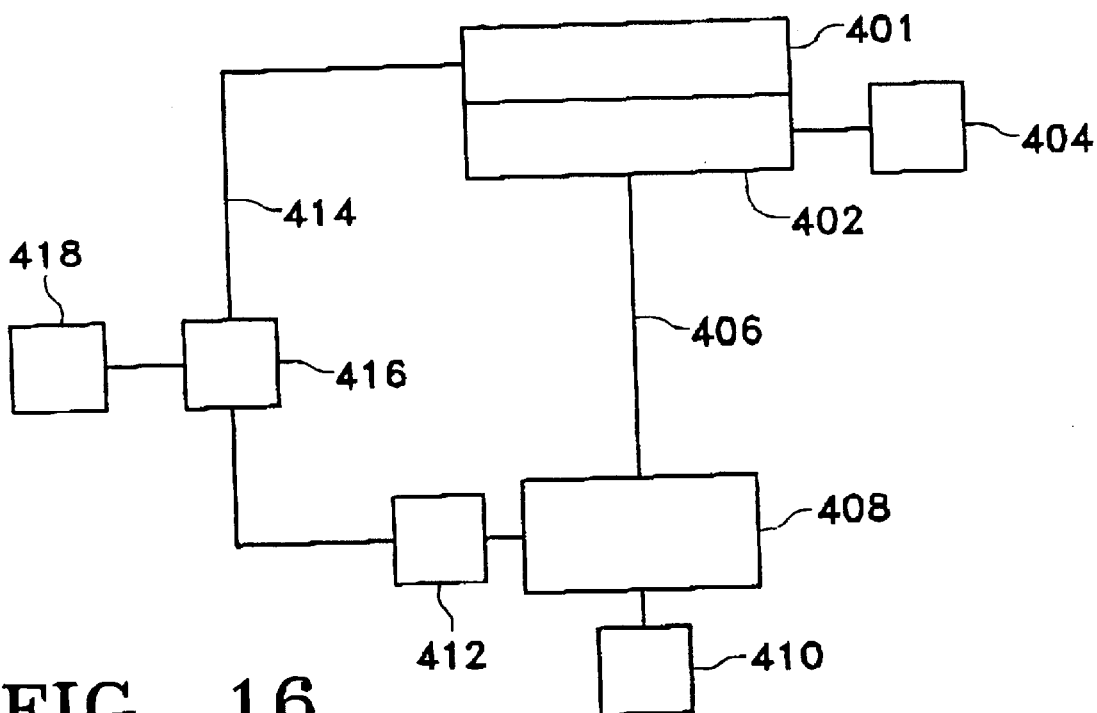
FIG. 16 is a schematic representation of a comminution and screening device as illustrated in FIG. 1.

In another variation of the present invention, a gaseous cooling medium is injected or sucked into foam powder as it is discharging from the mill, as schematically illustrated in FIG. 16. Polymeric foam pieces containing production contaminants are comminuted on a two-roll mill 401. The comminuted foam powder typically includes fine particles that are within a predetermined target particle size range and coarse particles that have a size exceeding the target size range. The comminuted foam particles containing production contaminants are discharged into a collection chamber 402, as described in more detail in connection with FIG. 11. A gaseous cooling medium 404 is introduced into the comminuted foam powder inside collection chamber 402. Chamber 402 communicates with a sifter 408 by means of a conduit 406. Cooling medium 404 flows through conduit 406, conveying the comminuted foam powder from chamber 402 to sifter 408, upon the creation of a pressure differential between chamber 402 and sifter 408 such that the pressure in the chamber is higher than the pressure in the inlet of sifter 408. Such a pressure differential can, for example, be created by employing a fan (not shown) in conduit 406 such that gaseous cooling medium is caused to flow from chamber 402 to sifter 408. Suitable fans include fans commonly known as centrifugal fans, which are typically used for moving large volumes of air or gas or for conveying material suspended in a gas stream. Alternatively, of course, an open-face fan such as described in connection with FIG. 5, may be utilized to create an effective pressure differential between chamber 402 and sifter 408.

Sifter 408 (FIG. 16) is employed for sifting or screening the comminuted foam powder by separately discharging fine particles that are within a predetermined target particle size range 410, and coarse particles 412. Production contaminants such as polymer foam skin, polymer film, and paper contamination may be present in the fine particles that have the desired particle size and/or in the coarse particles. The coarse particles are recirculated through a conduit 414, to mill 401 for additional comminution. The coarse particles are conveyed through conduit 414 employing for example a centrifugal or open-face fan (not shown) in conduit 414. Optionally, a diverter valve 416 is positioned between sifter 408 and mill 401 for diverting (418) coarse particles, for example when this coarse foam powder contains material that is not readily comminuted in mill 401. Preferably, sifter 408 comprises inventive sifter 374 as described above.

Optionally, some amount of additional cooling medium may be introduced in conduits 406 and 414, and in sifter 408, using for example a centrifugal or an open-face fan. Alternatively a cyclone (not shown) may be utilized in conduit 406 and/or conduit 414 for enhanced cooling of the foam powder. These cyclones can be utilized by expelling gaseous cooling medium, which has been heated by foam powder, through the top of the cyclone, and introducing additional gaseous cooling medium at a lower temperature after the cyclone, for example at the material outlet at the cyclone bottom. This gaseous cooling medium exchange is accomplished while conveying the foam powder through the respective cyclones. Examples of suitable cooling media include those discussed above.

Solvent Extraction

Figure 17:
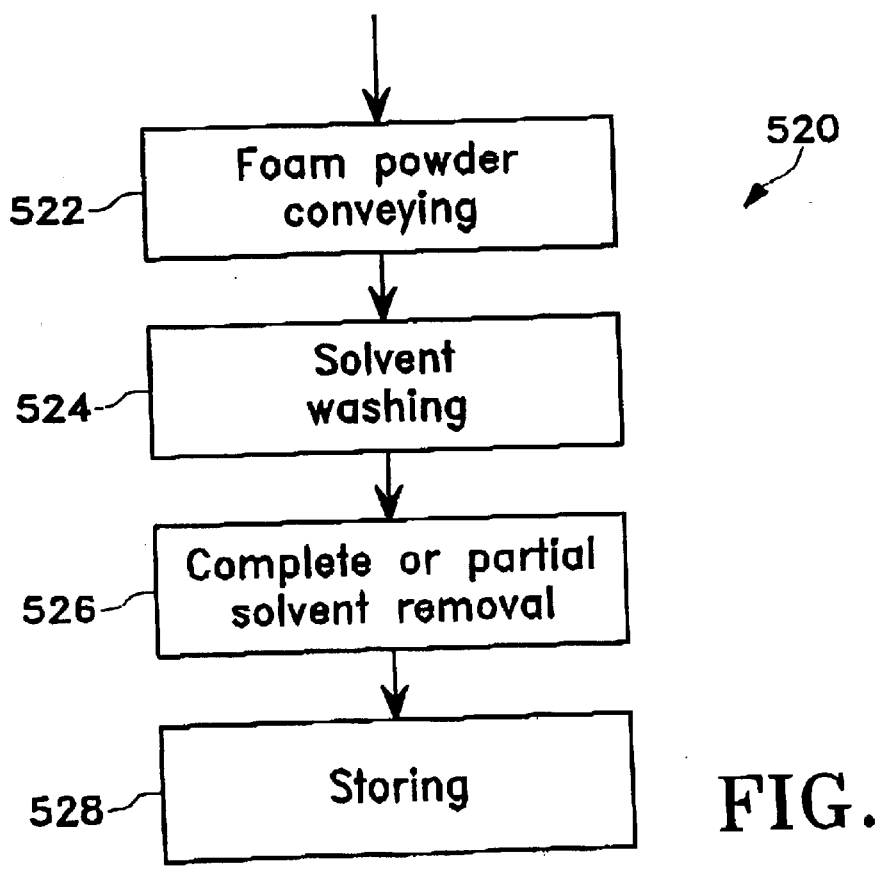
FIG. 17 is a flowchart schematically the solvent-washing feature of the process illustrated in FIG. 1.

Processing sequence 520, illustrated in FIG. 17, depicts a portion of the inventive process in which foam powder is treated with a solvent to remove oil and grease contamination. The foam powder is preferably target size foam powder from screening step 324 (FIG. 8) or from storing step 330. Returning to FIG. 17, the foam powder is conveyed to a solvent washing step 524 wherein the foam powder is treated with one or more solvents, specifically solvents that do not degrade PUR. Such solvents include for example, liquid carbon dioxide, perchloroethylene ($CCl_2CCl_2$), trichloroethanes, some alcohols, ketones such as acetone, alkanes, and halogenated hydrocarbons such as methylene chloride ($CH_2Cl_2$). Treatment includes agitation of foam particles suspended in solvent. Following washing step 524, solvent is removed for example by spin drying or spray drying in step 526. If necessary, the washing and drying steps can be repeated until substantially all oil and grease contamination is removed, after which the dry foam powder is collected in a storing step 528. Alternatively, a plurality of washing and drying steps can be used in series with the solvent and foam powder traveling counter-current to each other so that the cleanest solvent contacts the cleanest foam powder. The solvent is recycled within the washing step by, for example, distillation of the solvent from the oil and grease contamination and return of the solvent to the process and disposal of the separated contaminants.

In a preferred variation of the present invention, the final washing is carried out using a solvent that functions as a foam blowing agent when the foam powder is subsequently used in new foam. Methylene chloride, pentane, acetone and liquid carbon dioxide are examples of suitable liquids that can dissolve oil and grease, and are blowing agents in some foam systems such as PUR. Methylene chloride is preferred. In this inventive example, the final washing step can be carried out using a solvent that is a blowing agent. A solvent removal similar to step 526 (FIG. 16) is then used to provide an incomplete solvent removal resulting in foam particles having a desired quantity of absorbed solvent. A subsequent storing step such as step 528 is used to collect the foam powder with absorbed solvent. During storage, the solvent absorption on the foam particles equilibrates, resulting in a batch of foam powder that is substantially uniform in solvent absorption on the foam particles, even if not all foam powder increments that are discharged in the storage facility have the same level of solvent at the time when they are discharged for storage. This inventive process may, for example, be utilized to eliminate heat treatment of foam powder to remove solvent since it is not necessary to remove all of the solvent from the foam powder if the solvent is a blowing agent or is otherwise compatible with the new foam.

Preparing Mixtures with Foam Powder

Figure 18:
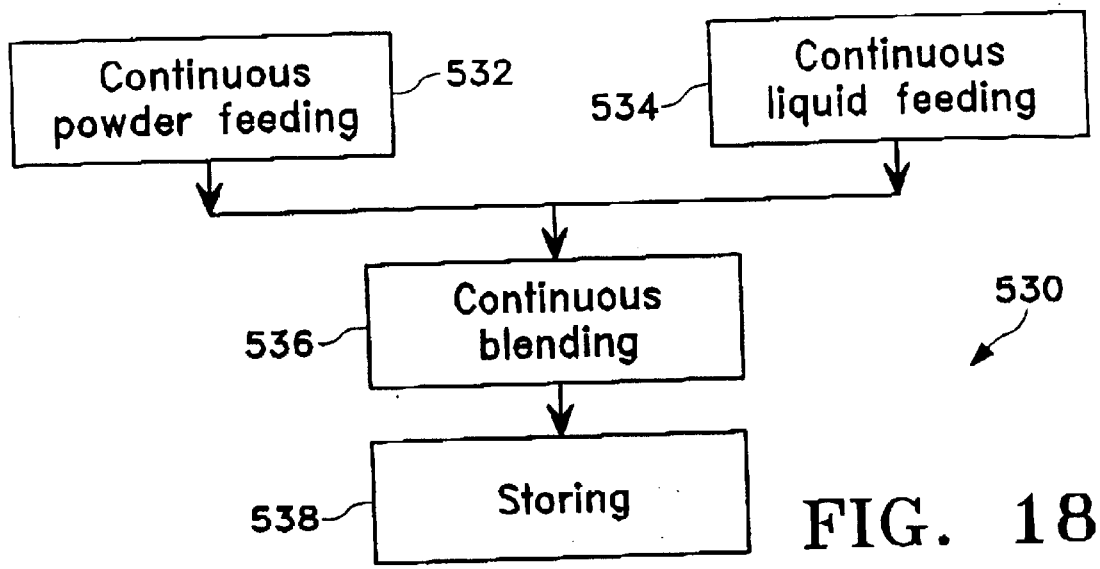
FIG. 18 is a flowchart schematically showing the continuous mixing sequence of the process illustrated in FIG. 1.
Figure 19:
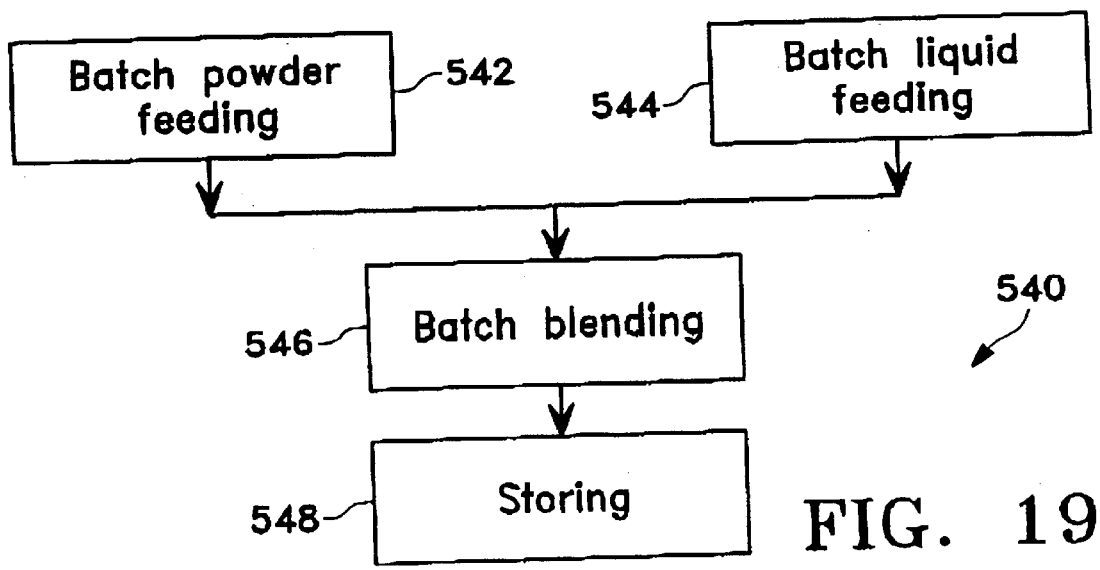
FIG. 19 is a flowchart schematically showing the batch mixing sequence of the process illustrated in FIG. 1.

Processing module 400 (FIG. 1), includes processing sequence 530, shown in FIG. 18, and alternative processing sequence 540, depicted in FIG. 19. Processing sequence 530 shows a continuous process for preparing mixtures of foam powder and polymerizable liquid; processing sequence 540 provides a batch process for preparing these mixtures.

Figure 21:
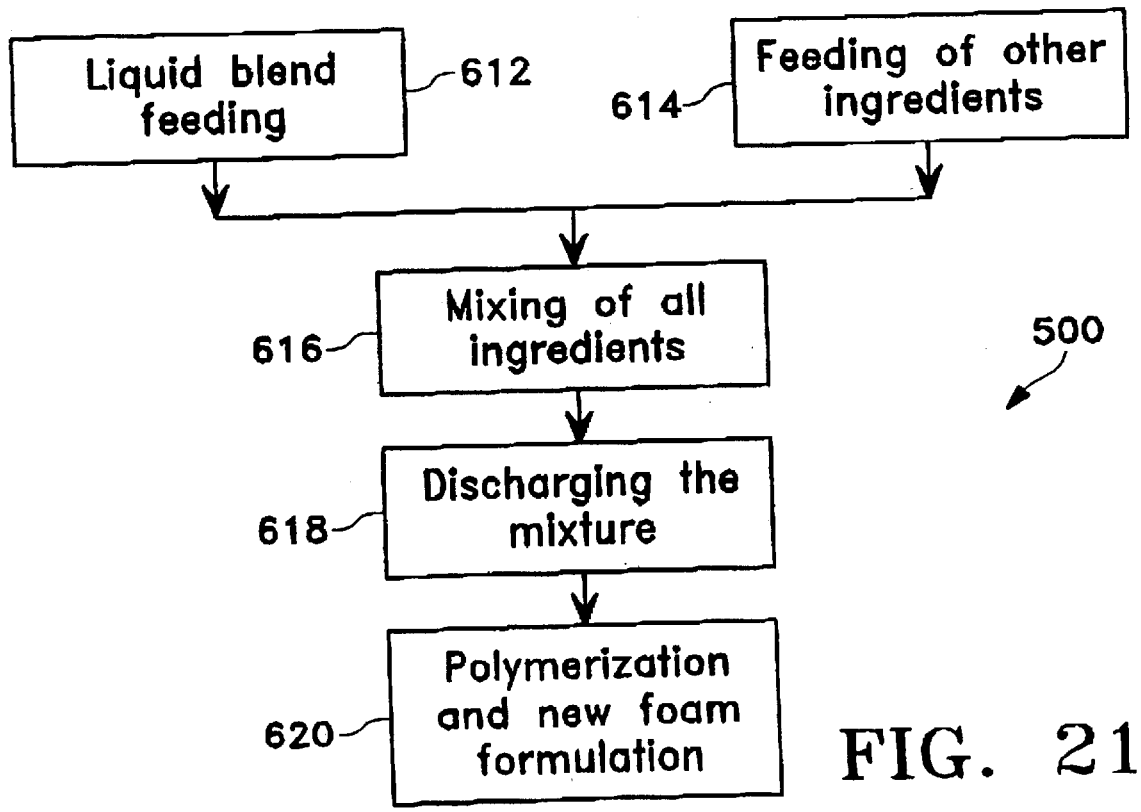
FIG. 21 is a flowchart schematically showing another processing sequence of the process illustrated in FIG. 1.

Returning to FIG. 18, foam powder is continuously fed in a foam powder feeding step 532, at a predetermined controlled rate to blending step 536, using for example a continuous weigh-feeder with a conveying belt heaving load cells underneath the belt to detect weight changes as material on the belt passes over the load cells. These types of continuous weigh feeders are well known to those of ordinary skill in the art. Polymerizable liquid is continuously fed at a predetermined controlled rate in liquid feeding step 534 of processing sequence 530. The liquid is fed at a controlled rate using for example pumps such as metering pumps that transfer liquid at a controlled rate. These pumps are well known to those of ordinary skill in the art. The foam powder and liquid components are fed to blending step 536 at rates that are predetermined in order to obtain the desired foam powder-to-liquid ratio. The foam powder and polymerizable liquid are continuously mixed in blending step 536 using for example in-line mixers such as are well known to those of ordinary skill in the art. The liquid blend is collected in optional storage step 538. When processing sequence 530 is used as part of a larger continuous process, the liquid blend may be continuously added to storing step 538 from blending step 536 and continuously removed from storage step 538 to subsequent processes, for example to step 612 (FIG. 21).

The blending step typically results in the introduction of air, causing the formation of foam or air bubbles in the mixture. It is undesirable to have air bubbles in the blend when this is subsequently polymerized and it is thus desirable to deaerate the blend. The liquid blend may be deaerated during the storing step by keeping the blend in storage, preferably with low intensity stirring, until the air bubbles have escaped from the blend. Alternatively, continuous deaeration can be achieved through continuous centrifuging (not shown) of the blend in a vacuum environment between steps 536 and 538 (FIG. 18).

Generally, it is desirable to use an in-line mixer in blending step 536, thereby avoiding the incorporation of air in the blend. High shear mixers are preferred for use in blending step 536.

Processing sequence 540, shown in FIG. 19, provides an alternate process for preparing a mixture of foam powder and polymerizable liquid, using batch preparation techniques. A predetermined quantity of foam powder is added in a batch feeding step 542, see FIG. 19, to a facility for conducting a batch blending step 546. Examples of suitable blending facilities include mixing containers or tanks equipped with one or more impeller or paddle mixers. Foam powder feeding step 542 can for example be executed by weighing a predetermined quantity of foam powder, or by continuously adding foam powder at a controlled rate similar to step 532 (FIG. 18) until the desired amount of foam powder has been added to the blending facility. A predetermined quantity of polymerizable liquid is added to the blending facility in batch feeding step 544. A predetermined quantity of liquid can be added by for example adding a predetermined weight or volume quantity of liquid to blending step 546. Alternatively, a predetermined quantity of liquid can be added through continuously feeding liquid at a controlled rate similar to step 534 (FIG. 18) until the desired quantity of polymerizable liquid has been added to blending step 546, shown in FIG. 19. Upon completion of blending step 546, a storing step 548 can be carried out in the blending facility. Alternatively, a storing step 548 can be carried out in a separate storage facility such as a storage tank or a drum. Entrapped air bubbles can be removed from the liquid blend using any of the technologies described in connection with processing sequence 530 (FIG. 18).

In an alternative method (not shown) foam powder is added under vacuum to continuous blending step 536 (FIG. 18) or batch blending step 546 (FIG. 19), thereby reducing the incorporation of air during the blending step. In yet another, but preferred method, foam powder is added to continuous blending step 536 under an atmosphere of $CO_2$ from which substantially all air is continuously purged. Because $CO_2$ is more soluble in the polyhydroxyl compound than air, significantly less bubbles are formed in the blend. This is advantageous because while the presence of dissolved gas promotes good foam structure, the presence of gas bubbles degrades the foam structure. Carbon dioxide is a well-known, environmentally benign blowing agent for PUR foam.

Figure 20:
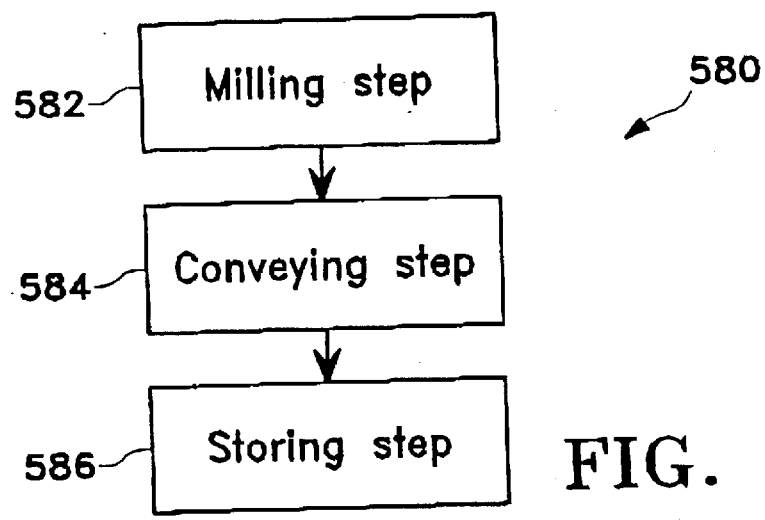
FIG. 20 is a flowchart schematically depicting a comminution step of the process illustrated in FIG. 1.

Returning to FIG. 1, the master process schematic shows a mixing step 400 for mixing powder and a polymerizing liquid. FIG. 20, in turn, shows a variation of that mixing step. In particular, an optional third-stage comminution is schematically depicted in FIG. 20 perhaps from continuous blending or storing steps 536 and 538 (FIG. 18) or from batch blending or storing steps 546 and 548 (FIG. 19) to comminution step 582, depicted in FIG. 20. Preferably, this comminution step is performed utilizing a mill adapted for comminuting materials having a liquid or paste consistency. Such mills include dispersion or colloid mills wherein the material is subjected to fluid shear forces generated by one or more mechanically activated surfaces. Examples include roller mills employing two or more rolls counter-rotating at different speeds and colloid mills wherein the liquid blend is comminuted between converging disks. Use of this step may allow removal of the earlier described generally dry roller mills. In any event, the most-desired use of the procedure is to produce foam powder particles of 100 microns, preferably 40 microns or smaller, and most preferably, of 10 microns or smaller. The comminuted foam powder, in the noted particle ranges may contain as much as 75% (by weight) of polymeric foam skins or smaller amounts, including the ranges of 20% to 60%, 20% to 50%, and any sub-range up to that 75%. It is an advantage of this process that extremely large amounts of those polymeric foam skins may be included and yet the small particle sizes of the foam powder attained.

Typically, the mill discharge is conveyed in a conveying step 584 to a storing step 586. Alternatively, the mill discharge is fed to a screen (not shown) that allows a predetermined particle size fraction to pass for conveying (not shown) to a storing step (not shown), while returning (not shown) the oversize fraction to the comminution step. Generally, it is desirable to deaerate the mill discharge using such deaeration techniques as have been described in connection with FIGS. 17 and 18.

Processing module 500 (FIG. 1 and FIG. 21) provides methods for polymerizing the blends containing foam powder emanating perhaps from storage steps such as steps 538 (FIG. 18), 548 (FIG. 19) or 586 (FIG. 20) or a continuous mixing step to prepare polymerized new foam that contains that foam powder. The blend of foam powder and liquid is fed in a controlled manner in feeding step 612 to a mixing step 616 using such techniques and devices as are well known to those of ordinary skill in the art including batch feeding and continuous feeding. Other polymerization and foam forming ingredients are similarly added in a controlled feeding step 614 to mixing step 616. It will be understood that step 614 may include several steps in order to add a variety of ingredients. For example, if PUR foam is desired, step 612 may comprise the step of feeding a blend of foam powder and active-hydrogen (e.g., polyhydroxyl or polyol) compounds. Step 614 may include the controlled feeding of a polyol blend containing water, one or more surfactants, catalysts, and blowing agents while a polyfunctional isocyanate such as toluene diisocyanate is separately added in a controlled manner to mixing step 616. Alternatively, each of the various materials may be added separately at a point immediately before the mix head that mixes all ingredients for forming the foam.

The foam powder may also be added to one or more liquids of processing step 614, shown in FIG. 21, in order to prepare liquid blends in processing steps 612 and 614 that have similar viscosities, resulting in improved mixing efficiency. The ingredients may be batch- or continuous-mixed in mixing step 616. Batch mixing is generally suitable when the ingredient mixture requires elevated temperatures to polymerize, e.g., polyimide foam. Continuous mixing is preferred when the ingredient mixture is capable of initiating polymerization at ambient temperatures, e.g., PUR foam. The polymerizable mixture is discharged in a discharging step 618 (FIG. 21) from mixing step 616 to a polymerization and new foam formation step 620. Step 620 may take place in a mold or may be continuous, depending on the type of polymeric foam and the intended function of the foam.

As described in connection with FIGS. 18, 19, and 20, blending of foam powder and polymerizable liquid, particularly if done in the presence of air, may require a deaeration step to remove foam and air bubbles. We have found that preparation of blends of foam powder with polymerizable liquid under an atmosphere of $CO_2$ from which air was substantially purged produces blends that require less degassing than blends that have not been prepared in a $CO_2$ environment.

We have also found that the addition of a low concentration of active-hydrogen compounds (e.g., 0.01% to 5.0% by weight of polyol), to the polymeric foam pieces and polymeric foam powders, generally on the outside of the foam powder particles or pieces, results in improved material handling properties. Specifically, upon such addition, we have found that the foam pieces and foam powder are less prone to form a coating, also known as plating, on the surfaces of processing equipment. Indeed, in most instances, the plating is eliminated. Further, problems with handling due to static electricity are minimized. The active-hydrogen compound may be misted on the foam pieces or foam powder as it is transported in the processing equipment. Preferably, it is added to air used for pneumatic conveying or cooling of these foam products.

A wide variety of polymeric foams including production contaminants may be processed using our inventive methods and devices of our invention. For example, if a PUR foam is processed, suitable polymerizable liquids for blending with foam powder include polyfunctional isocyanates or active-hydrogen compounds such as polyhydroxyl compounds, hydroxyl-terminated polyesters, and hydroxyl-terminated polyethers. On the other hand, if a polyimide foam is processed, a suitable polymerizable liquid for blending with foam powder includes acetic anhydride. The foam powder and acetic anhydride blend may subsequently be used to prepare a new foam by mixing and heating the blend with solid polyamide, 4-benzoyl pyridine, and glass microspheres. The present techniques may also be employed to prepare polyisocyanurate foam, wherein suitable polymerizable liquids for blending with foam powder include isocyanurates and active-hydrogen compounds because these compounds can be used to prepare polyisocyanurate foam.

The level of PUR foam powder that may be included in a new PUR foam typically ranges from about 3% to about 60% by weight. The methods, techniques, and devices of the present invention are suitable for comminuting and processing PUR foam containing foam skins and/or polymer sheet and/or paper at levels ranging from 0.1%, preferably from about 0.5%, to about 75% particularly when processing PUR bun trimmings. The resulting newly formed PUR foam can thus include processing or production contaminants at levels ranging from 0.003%, preferably from about 0.015% to about 65%, generally preferable is an amount in the ranges of 20% to 65%, 20% to 50%, 20% to and any sub-range up to that 65%. It is an advantage of this process that extremely large amounts of those polymeric foam skins may be included. New PUR foam can be made with foam powder in a wide range of density and hardness. For example, flexible slabstock foam that contains foam powder with production contaminants typically has a density in the range of about 13 to about 70 kg/m$^3$. The hardness of this foam (as determined by the 25% IFD test in method ASTM D3574) is typically about 25 to 200 N/323 cm$^2$. Foams with higher density and hardness are also possible; however, these have less commercial significance.

EXAMPLES

Example 1

Flexible-slabstock polyurethane foam production scrap was obtained from trimming the skins from foam buns. The scrap contained dense skin material and polyethylene film, with the balance being polyurethane foam of varying density. This scrap material was first reduced to pieces with a size of approximately 1 cm. The foam pieces were then comminuted on 56-cm-diameter, 152-cm-length counter-rotating rolls such as those shown in FIG. 11 with speeds of 27 and 80 rpm. The resulting material was scraped together and quenched as it exited the rolls, and exposed to a turbulent air flow at room temperature. The material was discharged together with the air flow and conveyed to a sifter. The material was screened in the sifter, resulting in a fine foam powder having the particle-size distribution shown in Table 1. A coarse fraction that was also obtained from the sifter was returned to the counter-rotating rolls. The fine foam powder collected from the sifter was subsequently used to make new flexible-slabstock polyurethane foams with densities from 18 kg/m$^3$ to 35 kg/m$^3$ with powder content of up to 15% by weight of this powder.

TABLE 1

| U.S. standard sieve designation | weight % passing the screen | |
|---|---|---|
| | example 1 | example 2 |
| No. 80 | 100% | 100% |
| No. 120 | 100% | 89% |
| No. 200 | 84% | 55% |
| No. 325 | 49% | 24% |

Example 2

Flexible-slabstock polyurethane foam production scrap was obtained from trimming the skins from buns of foam made with polyether polyols. The scrap material included 2.3% by weight of high-density polyethylene film with a thickness of about 25 microns, and 30% by weight of dense skin material, with the balance being polyurethane foam of varying density. This scrap material was first reduced to pieces with a size of approximately 3 cm by means of a rotary grinder. The foam pieces were then comminuted on 30-cm-diameter, 45-cm-length counter-rotating rolls such as those shown in FIG. 11 with speeds of 30 and 120 rpm. The resulting material was scraped together and quenched as it exited the rolls, and exposed to a turbulent air flow at room temperature. The material was discharged together with the air flow and conveyed to the inventive sifter as shown in FIG. 13A. The material was screened in the sifter, resulting in a fine foam powder having the particle-size distribution shown in Table 1. A coarse fraction that was also obtained from the sifter was returned to the counter-rotating rolls.

Example 3

A slurry sample was prepared by mixing 15 parts of the fine polyurethane powder described in Example 1 with 100 parts of VORANOL® 3137 polyether polyol from The Dow Chemical Company. This polyol is a liquid polyhydroxyl compound having a viscosity of about 460 centipoise at a temperature of 25° C.

Figure 22:
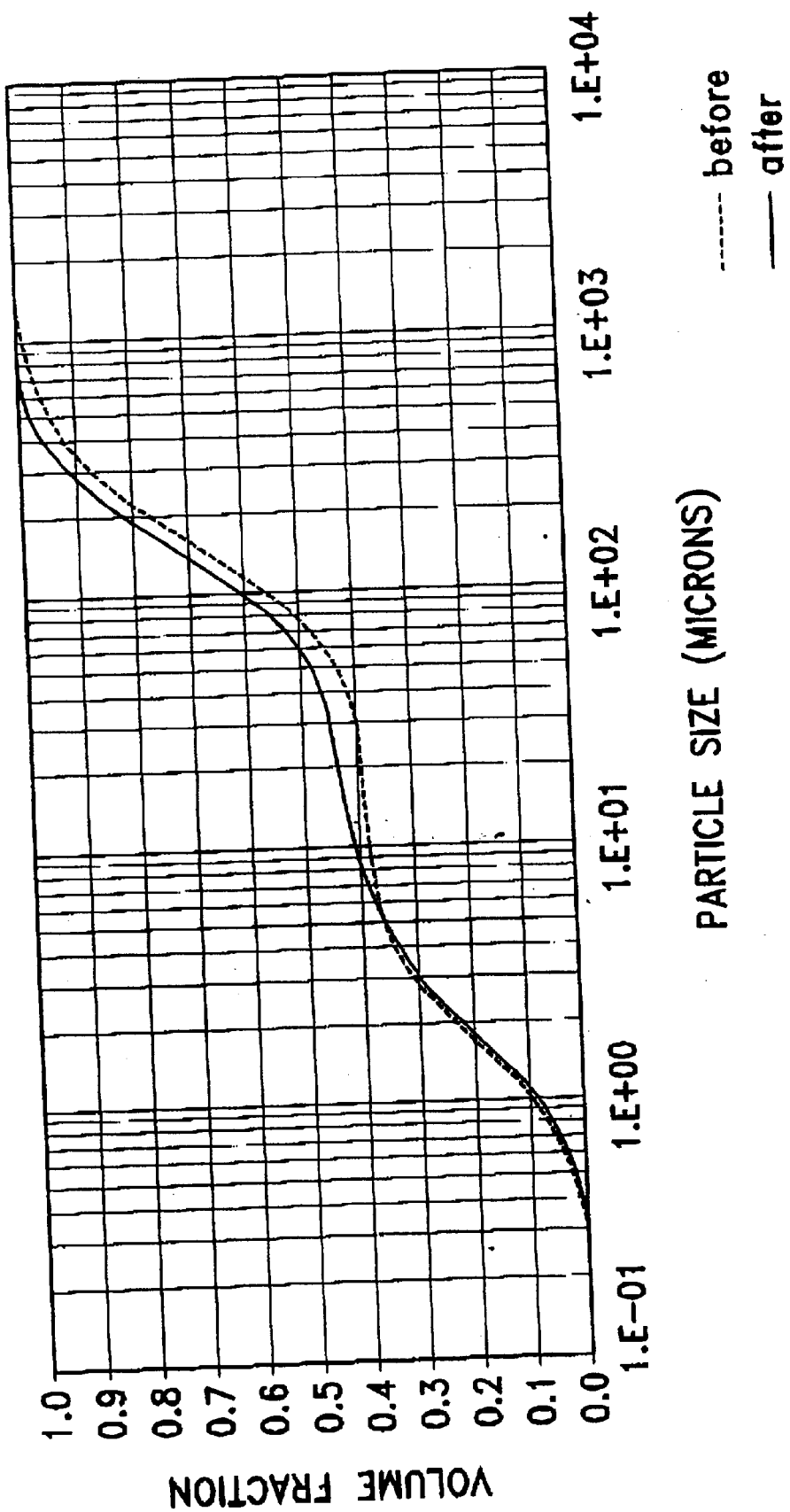
FIG. 22 is a graphical illustration of a foam powder size distribution made according to the invention as shown in the Examples.
Figure 23:
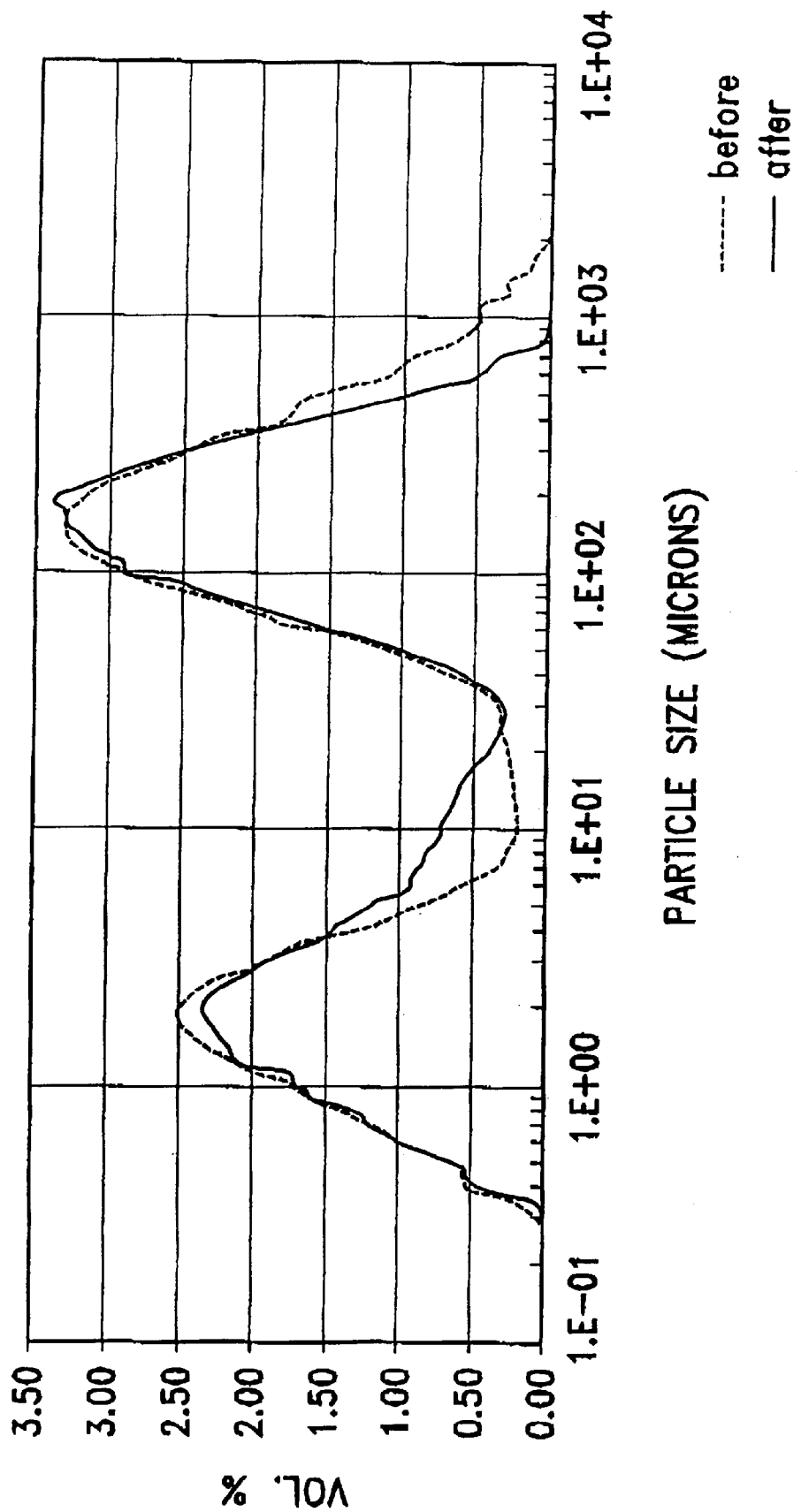
FIG. 23 is a graphical illustration of a foam powder size distribution made according to the invention as shown in the Examples.

The beneficial size reduction effects which are obtained by high-shear mixing of polyurethane powder in a polyhydroxyl compound are illustrated in FIGS. 22 and 23. After taking a small sample to measure particle size before high shear mixing, the remaining batch was subjected to 2.5 minutes of high shear mixing using a Silverson L4R laboratory high shear mixer. The mixer generates fluid shear by means of centrifugal action of a rotor in a high shear rotor/stator workhead. Particle size analysis was performed using a laser-diffraction technique with a Mastersizer 2000 from Malvern Instruments, Southborough, Mass.

The results are shown in the graphs depicted in FIGS. 22 and 23, which show particle size in microns on the x-axis. FIG. 22 shows a cumulative distribution in volume fraction while FIG. 22 shows volume percent as a function of particle size in microns. These graphs show a significant shift in foam particle size, particularly at the high end of the size range. The content of high end particles is less: for instance, before the grinding step, 5% of the particles were larger than 600 microns; after the grinding, there were no particles larger than 600 microns.

Example 4

Pieces of polyurethane foam with a size of approximately 1 cm were loaded into a bin. The bin had a 1 ft$^2$ open area on the bottom that was covered with a screen. The screen had both 4-inch by 4-inch openings and 1-inch by 1-inch openings in it. The foam chunks did not fall out of the opening in the screen when the bin was at rest. The bin was then agitated sinusoidally in a direction parallel to the screen at a frequency of about 3 Hz and an amplitude of about four inches. While the bin was agitated, the foam chunks fell out through the screen at a rate of about 4 ft$^3$/min. When the agitation was stopped, flow of the foam chunks also stopped.

Example 5

A slurry of 16.7% by weight of the fine powder described in Example 1 in VORANOL 3137 was prepared. The slurry contained 10 volume percent air as shown by volume change upon settling for 48 hours. The slurry was pumped one-pass through a Cornell D-16 Versator at 10 gpm and a vacuum of -27 in. Hg (about 0.01 bar absolute pressure). The resulting slurry contained no measurable entrained air.

Example 6

The fine powder described in Example 1 was mixed into polyol under an atmosphere of carbon dioxide from which the air had been purged. The resulting slurry had less than 12.6% entrained gas bubbles by volume (presumably carbon dioxide). An identical slurry mixed under air, without $CO_2$, had 16% entrained gas bubbles by volume (presumably air).

We claim as our invention:

1. A method of preparing foam powder from polymeric foam, the method comprising:
    a) comminuting the foam in a crusher comprising at least two surfaces moving at different speeds, said comminuting comprising contacting at least a portion of the foam to said at least two surfaces, thereby preparing a crushed product comprising particles;
    b) quenching the crushed product exiting the crusher with a cooling medium, wherein a mass flow rate of the cooling medium has a value that is at least a certain percentage of a mass flow rate of the crushed product, wherein said value is at least a minimum value suitable for dilute phase pneumatic conveying of the crushed product and
    c) separating said particles from the crushed product, wherein substantially all of the crushed product exiting the crusher is scraped off said at least two surfaces of said crusher prior to separating said particles from the crushed product.

2. The method of claim 1 wherein comminuting comprises comminuting by means of a two-roll mill having a first roll and a second roll.

3. The method of claim 2 wherein said comminuting comprises operating the two-roll mill such that the first roll is operated at a first surface speed while the second roll is operated at a second surface speed which is different than the first surface speed.

4. The method of claim 3 wherein said first surface speed is up to ten times the second surface speed.

5. The method of claim 2 further comprising cooling at least one of the first roll and second roll.

6. The method of claim 2 wherein said particles have a maximum particle size of about 2 mm or less.

7. The method of claim 2 wherein quenching comprises exposing said crushed product to a gaseous first cooling medium.

8. The method of claim 7 wherein quenching comprises exposing said crushed product to a gaseous first cooling medium at a contact point between the first roll and the second roll.

9. The method of claim 8 wherein said gaseous first cooling medium is up to 125° C. less than the temperature of said crushed product as it leaves the region between the first roll and the second roll.

10. The method of claim 8 wherein said gaseous first cooling medium is 5° C. to 125° C. less than the temperature of said crushed product as it leaves the region between the first roll and the second roll.

11. The method of claim 8 wherein said gaseous first cooling medium is 10° C. to 125° C. less than the temperature of said crushed product as it leaves the region between the first roll and the second roll.

12. The method of claim 8 wherein said gaseous first cooling medium is 25° C. to 125° C. less than the temperature of said crushed product as it leaves the region between the first roll and the second roll.

13. The method of claim 8 wherein said gaseous first cooling medium is 50° C. to 125° C. less than the temperature of said crushed product as it leaves the region between the first roll and the second roll.

14. The method of claim 8 wherein the first gaseous cooling medium is in turbulent flow.

15. The method of claim 14 wherein the first gaseous cooling medium is at a temperature below 115° C. prior to the quenching step.

16. The method of claim 15 wherein the polymeric foam contains a contaminant comprising polyethylene having a softening temperature greater than the temperature of the first gaseous cooling medium.

17. The method of claim 7 wherein the first gaseous cooling medium is cooled to a temperature below ambient.

18. The method of claim 7 wherein the gaseous cooling medium comprises one or more substances selected from the group consisting of gaseous air, nitrogen gas, carbon dioxide gas, mixtures of those gases, any of the aforementioned gases which additionally include droplets or vapor of liquids including water, alcohols, ketones, alkanes, or halogenated solvents.

19. The method of claim 7 additionally wherein said separating comprises screening said crushed product by means of a sifter.

20. The method of claim 7 wherein exposing said crushed product to a first cooling medium comprises:
   a) collecting said crushed product in a collection chamber; and
   b) exposing said crushed product to the first cooling medium inside the collection chamber.

21. The method of claim 20 further comprising conveying said crushed product from the chamber to a sifter through a first conduit communicating between the collection chamber and the sifter.

22. The method of claim 21 wherein conveying comprises conveying by means of a gaseous flow.

23. The method of claim 22 wherein the gaseous flow includes the first gaseous cooling medium.

24. The method of claim 22 wherein the gaseous flow includes a second gaseous cooling medium.

25. The method of claim 21 additionally comprising screening said crushed product in the sifter and thereby forming:
   (a) a third polymeric foam powder comprising first foam particles having a predetermined first particle size range and substantially excluding second foam particles having a second particle size range that exceeds the first particle size range; and
   (b) a fourth polymeric foam powder comprising the second foam particles.

26. The method of claim 25 additionally comprising adding a third gaseous cooling medium to the sifter.

27. The method of claim 25 additionally comprising:
   a) conveying the fourth polymeric foam powder to the two-roll mill; and
   b) comminuting the fourth polymeric foam powder.

28. The method of claim 27 additionally comprising adding a fourth gaseous cooling medium during conveying of the fourth polymeric foam powder.

29. The method of claim 1 wherein the polymeric foam is prepared for comminution in said step a) by the steps of:
   i) fragmenting the foam products which further comprise:
      (1) one or more production contaminants and (2) one or more consumer contaminants and
   ii) removing said consumer contaminants, thereby preparing foam fragments comprising said one or more production contaminants.

30. The method of claim 29 wherein the production contaminants are selected from the group consisting of polymeric foam skins, polymeric sheet, and paper.

31. The method of claim 29 wherein the consumer contaminants are selected from the group consisting of wood, fiber, leather, ferrous metals, non-ferrous metals and glass.

32. The method of claim 1 wherein comminuting comprises comminuting by a roll mill having three or more rolls.

33. The method of claim 1 wherein the polymeric foam comprises polyurethane foam that is contaminated with one or more contaminants selected from the group consisting of polyurethane foam skins, polymeric sheet, and paper.

34. A polyurethane foam powder prepared by the process of claim 27.

35. The method of claim 1 wherein the polymeric foam comprises polyurethane foam that is contaminated with polyurethane foam skins.

36. The method of claim 1 wherein the polymeric foam comprises polyurethane foam that is contaminated with polymeric sheet.

37. The method of claim 1 wherein the polymeric foam comprises polyurethane foam that is contaminated with paper.

38. The method of claim 25 wherein the polymeric foam is a polyurethane foam contaminated with one or more contaminants selected from the group consisting of polyurethane foam skins, polymer sheet, and paper.

39. The method of claim 38 wherein the polymeric foam contains from about 0.1% to about 75% by weight of contaminants.

40. The method of claim 39 wherein the polymeric foam contains from about 0.5% to about 75% by weight of contaminants.

41. A method of preparing foam powder from polymeric foam, the method comprising:
   a) comminuting the foam in a crusher comprising at least two surfaces moving at different speeds, said comminuting comprising contacting at least a portion of the foam to said at least two surfaces, thereby preparing a crushed product comprising particles;
   b) quenching the crushed product exiting the crusher with a cooling medium, wherein a mass flow rate of the cooling medium has a value that is at least 3% of a mass flow rate of the crushed product, and
   c) separating said particles from the crushed product, wherein at least 10 volume percent of said particles have a particle size of about 150 microns or less.

42. A method of preparing foam powder from polymeric foam, the method comprising:
   a) comminuting the foam in a crusher comprising at least two surfaces moving at different speeds, said comminuting comprising contacting at least a portion of the foam to said at least two surfaces, thereby preparing a crushed product comprising particles;
   b) quenching the crushed product exiting the crusher with a cooling medium, wherein a mass flow rate of the cooling medium has a value that is at least 3% of a mass flow rate of the crushed product, and
   c) separating said particles from the crushed product, wherein at least 10 volume percent of said particles have a particle size of about 150 microns or less, and a majority of said particles are of such a size that, when viewed on a particle-by-particle basis, do not have elongated sections left from a foam structure jutting from a central junction.

43. A method of claim 1, wherein the polymeric foam is a contaminated polymeric foam.

44. A method of claim 42, wherein the polymeric foam is a contaminated polymeric foam.

45. A method of claim 43, wherein the polymeric foam is a contaminated polymeric foam.

* * * * *